(12) United States Patent
Rabii et al.

(10) Patent No.: US 8,176,012 B1
(45) Date of Patent: May 8, 2012

(54) READ-ONLY MIRRORING FOR LOAD SHARING

(75) Inventors: Faramarz Rabii, Ashland, MA (US);
Peter Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 788 days.

(21) Appl. No.: 12/287,099

(22) Filed: Oct. 6, 2008

(51) Int. Cl.
*G06F 17/30* (2006.01)
(52) U.S. Cl. ........................................................ 707/655
(58) Field of Classification Search .................... 707/655
See application file for complete search history.

(56) References Cited

U.S. PATENT DOCUMENTS

| | | | |
|---|---|---|---|
| 5,568,629 | A | 10/1996 | Gentry et al. |
| 5,889,934 | A | 3/1999 | Peterson |
| 6,421,684 | B1 | 7/2002 | Cabrera et al. |
| 7,127,577 | B2 | 10/2006 | Koning et al. |
| 7,237,021 | B2 | 6/2007 | Penny et al. |
| 7,269,696 | B2 | 9/2007 | Muhlestein et al. |
| 7,284,030 | B2 | 10/2007 | Ackaouy et al. |
| 7,340,486 | B1 | 3/2008 | Chapman |
| 7,340,639 | B1 | 3/2008 | Lee et al. |
| 2004/0024786 | A1* | 2/2004 | Anderson et al. ............. 707/200 |
| 2005/0138369 | A1* | 6/2005 | Lebovitz et al. .............. 713/163 |
| 2006/0248379 | A1 | 11/2006 | Jernigan |
| 2007/0088702 | A1* | 4/2007 | Fridella et al. ................. 707/10 |
| 2009/0063748 | A1* | 3/2009 | Bello et al. ......................... 711/4 |

OTHER PUBLICATIONS

Streaming Media Caching and Replication Techniques Copyright © 2000 IBM, NOB Interactive, Telematica Instituut, TNO, SURFnet.
Data ONTAP GX: A Scalable Storage Cluster Copyright © 2006 Michael Eisler, Peter Corbett, Michael Kazar, Daniel S. Nydick, J. Christopher Wagner.

* cited by examiner

*Primary Examiner* — Sheree Brown
*Assistant Examiner* — Michael Le
(74) *Attorney, Agent, or Firm* — Blakely, Sokoloff, Taylor & Zafman LLP

(57) ABSTRACT

A system and method that provides users of network data storage with the ability to gain advantages of a clustered storage server system, in which volumes from multiple server nodes are linked into a virtual global hierarchical namespace, without first having to migrate their data to the clustered storage server system. The system and method extends the global namespace of the clustered storage server system to allow access to one or more volumes stored on one or more remote storage servers over at least one network pathway communicably connecting the remote storage servers and the clustered storage server system. In addition, the system and method allows loads to the clustered system and to the remote storage servers to be balanced or shared by generating at least one set of mirrored volumes accessible via the extended global namespace of the clustered system.

50 Claims, 15 Drawing Sheets

READ-ONLY MIRRORING FOR LOAD SHARING

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present invention relates generally to network data storage systems, and more specifically to systems and methods of extending the namespace of a clustered network data storage system to allow access to volumes stored on one or more remote network data storage systems, and to allow the balancing of loads across the clustered and remote network data storage systems.

BACKGROUND OF THE INVENTION

As computer networks have become faster and more reliable, the deployment, of network data storage systems in enterprise computing environments has become more widespread. In a typical enterprise computing environment, client systems such as computer workstations, database servers, web servers, and other application servers can access data stored in one or more central locations. One or more computer networks, e.g., one or more local area networks (LANs) or wide area networks (WANs), connect the client systems to mass storage devices such as disks disposed at the central locations. Such centralized data storage, referred to hereinafter as "network data storage", facilitates the sharing of data among many geographically distributed client systems. Network data storage also enables information systems (IS) departments to use highly reliable (sometimes redundant) computer equipment to store their data.

In the typical network data storage environment, specialized computers such as file servers, storage servers, storage appliances, etc. (referred to hereinafter as "storage servers") located at the central locations make the data stored on the disks available to the client systems. Each storage server typically has a monolithic architecture, in which network and data components are contained within a single device. Software running on the storage servers and other software running on the client systems communicate according to well-known protocols such as the Network File System (NFS) protocol and the Common Internet File System (CIFS) protocol to make the data stored on the disks appear to users and application programs as though the data were stored locally on the client systems. Each storage server makes data available to the client systems by presenting or exporting one or more volumes, or one or more sub-volume units referred to herein as "qtrees", to the client systems. Each volume is configured to store data files, scripts, word processing documents, executable programs, and the like. From the perspective of a client system, each volume can appear to be a single disk drive. However, each volume can represent the storage space in a single storage device, a redundant array of independent disks (RAID) or a RAID group, an aggregate of some or all of the storage space in a set of storage devices, or any other suitable set of storage space.

Specifically, each volume can include a number of individually addressable files. For example, in a network attached storage (NAS) configuration, the files of a volume are addressable over a computer network for file-based access. Each volume may be composed of all or a portion of the storage available on a single disk or on multiple disks. In addition, an aggregate is a fixed-sized volume built on top of a number of RAID groups which contain other volumes referred to herein as "virtual volumes" or "FlexVol® flexible volumes". An aggregate is therefore a container for virtual or flexible volumes. Accordingly, there are generally two types of volumes, i.e., traditional volumes that are built directly on top of RAID groups, and virtual or flexible volumes that are built on aggregates, which in turn are built on top of RAID groups, which in turn are built on top of whole drives.

In a typical mode of operation, a client system transmits one or more input/output commands such as a request for data over a network to a storage server or a virtual storage server, which receives the request, issues one or more I/O commands to the appropriate disk(s) to read or write the data on behalf of the client system, and issues a response containing the requested data to the client system. It should be understood that a storage server can be partitioned into a number of virtual storage servers for administrative purposes. Further, a fixed-sized volume (i.e., an aggregate) can be partitioned into a number of virtual or flexible volumes. Any suitable combination of storage servers and volumes is possible, such as a storage server with fixed-sized volumes, a storage server with virtual or flexible volumes built on aggregates, a virtual storage server with fixed-sized volumes, and a virtual storage server with virtual or flexible volumes.

Multiple storage servers can be arranged in a cluster configuration to form a single storage server system. Such a clustered storage server system has a distributed architecture that includes a plurality of server nodes interconnected by a switching fabric. Each server node typically includes a network module (an N-module), a disk module (a D-module), and a management module (an M-host). The N-module provides functionality that enables a respective node within the clustered system to connect to a client system over a computer network, the D-module provides functionality enabling the respective node to connect to one or more disks, and the M-host provides management functions for the clustered system. A switched virtualization layer is provided below the interface between the N-module and the client system(s), allowing the disks associated with the multiple nodes in the cluster configuration to be presented to the client system(s) as a single shared storage pool. In a typical mode of operation, a client system transmits an NFS or CIFS request for data to one of the server nodes within the clustered system. The request typically includes a file handle for a data file stored in a specified volume. The N-module within the node that received the request extracts a volume identifier from the file handle, and uses the volume identifier to index a volume location database (VLDB) to obtain an identification of the aggregate storing the specified volume. The N-module then uses the aggregate identification to locate the D-module responsible for the aggregate, and transmits a request to the D-module for the data on the specified volume using an internal protocol. The D-module executes the request, and transmits, using the internal protocol, a response containing the requested volume data back to the N-module, which in turn transmits an NFS or CIFS response with the requested data to the client system. In this way, the N-modules can export, to one or more client systems, one or more volumes that are stored on aggregates accessible via the D-modules.

In recent years, IS departments have been increasingly transitioning from traditional monolithic storage servers to distributed storage server systems to satisfy their network data storage needs. It would be desirable, however, to provide users of network data storage systems with the ability to gain advantages of clustered storage server systems during the transition period from traditional storage servers to distributed storage server systems, without first having to migrate their data from the traditional storage servers to the distributed storage server systems.

BRIEF SUMMARY OF THE INVENTION

In accordance with the present invention, a system and method is disclosed that provides users of network data storage systems with the ability to gain the advantages of a clustered storage server system, in which volumes stored on multiple server nodes are linked into a virtual global hierarchical namespace, without first having to migrate their data to the clustered system.

As used herein, the term "namespace" refers to a virtual hierarchical collection of unique volume names or identifiers and directory paths to the volumes, in which each volume represents a virtualized container storing a portion of the namespace descending from a single root directory. For example, each volume associated with a namespace can be configured to store one or more data files, scripts, word processing documents, executable programs, etc. In a typical storage server system, the names or identifiers of the volumes stored on a storage server can be linked into a namespace for that storage server. In addition, as used herein, a "global namespace" refers to a virtual hierarchical collection of unique volume names or identifiers and directory paths to the volumes, in which the volumes are stored on multiple server nodes within a clustered storage server system. In the context of the present invention, the global namespace of a clustered storage server system can be extended to include not only the identifiers of volumes stored on the multiple server nodes of the clustered system, but also the identifiers of volumes stored on one or more storage server systems that are separate and remote from and do not constitute a part of the clustered system. In one embodiment, volumes are linked together in such an extended global namespace through "junctions". A junction is an internal mount point which, to a client, resolves to a directory (which would be the root directory of the target volume). From the perspective of a client system, a junction appears as a normal directory in the namespace exported by the clustered storage server system.

By extending the global namespace of a clustered storage server system to include both volumes stored on the clustered system and volumes stored on one or more storage server systems that are separate and remote from the clustered system, client systems can access the volumes of the remote systems through the extended global namespace of the clustered system, thereby allowing the client systems to gain the advantages of the clustered system without first having to migrate their data from the remote storage server systems to the clustered system. Such advantages include horizontal scalability, the ability to transparently migrate volume data among the multiple server nodes of the clustered system and the remote storage server systems, and the ability to provide load sharing for mirrors of volumes.

In one exemplary embodiment, a method is provided for accessing data on a volume of a storage server, in which the volume is one of a set of mirrored volumes. In this embodiment, the method can be employed to implement load sharing within a network data storage system including a cluster of storage servers and at least one remote storage server separate from the cluster of storage servers. The method includes providing a set of mirrored volumes, in which at least one of the set of mirrored volumes is stored on at least one storage server of the cluster of storage servers, and at least one of the set of mirrored volumes is stored on the remote storage server. Each of the mirrored volumes stored on the storage server of the cluster of storage servers is linked into a global namespace of volumes of the cluster of storage servers via a junction. Further, the global namespace is extended to include each of the mirrored volumes stored on the remote storage server, each of which is linked into the extended global namespace via a junction. It is noted that a junction can point to either local or remote volumes. A junction points to a set of one or more volumes, each identified by a Data Set Identifier (DSID). A DSID identifies either a local or remote volume. Thus, a junction can point to a set of mirror copies where each volume may reside either locally on the cluster of storage servers or remotely on the remote system. A request from a client for data on a volume of the set of mirrored volumes is received at the storage server of the cluster of storage servers. In response to the client request, the storage server of the cluster of storage servers selects a volume of the set of mirrored volumes. In the event the selected volume is stored on the remote storage server, the storage server of the cluster of storage servers obtains, using the extended global namespace, location information for the selected remote volume of the set of mirrored volumes. Next, the storage server of the cluster of storage servers locates the selected remote volume of the set of mirrored volumes using the location information. The storage server of the cluster of storage servers then accesses the requested data on the located remote volume of the set of mirrored volumes.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A system and method is disclosed that provides users of network data storage systems with the ability to gain the advantages of a clustered storage server system, in which volumes stored on multiple server nodes are linked into a virtual global hierarchical namespace, without first having to migrate their data to the clustered storage server system. The presently disclosed system and method extends the global namespace of the clustered storage server system to allow access, via the extended global namespace, to volumes stored on one or more storage servers that are separate and remote from and do not constitute a part of the clustered system. The extended global namespace can also be employed to access volumes within a set of mirrored volumes stored on the clustered system and on the remote storage servers for the purpose of load balancing or sharing.

A. Storage Server System Including at Least One Storage Server

Figure 1:
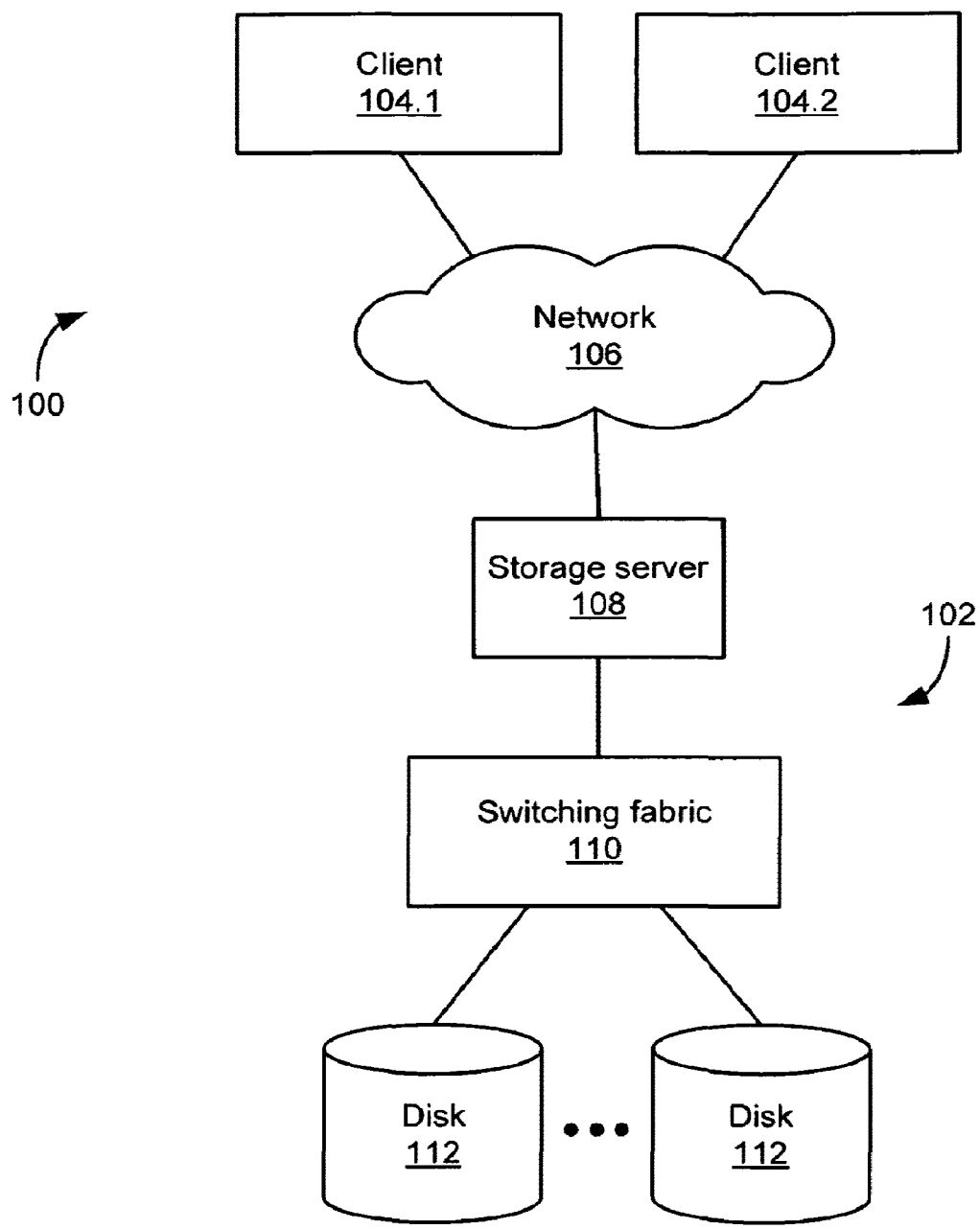
FIG. 1 is a block diagram of a storage server deployed in a typical computing environment.

FIG. 1 depicts an illustrative embodiment of a typical network data storage environment 100, including a plurality of client systems 104.1-104.2, a storage server system 102, and at least one computer network 106 communicably connecting the client systems 104.1-104.2 and the storage server system 102. As shown in FIG. 1, the storage server system 102 includes a storage server 108, a switching fabric 110, and at least one mass storage device such as a disk 112. For example, storage servers like the storage server 108 are available from NetApp, Inc., Sunnyvale, Calif., USA. The client systems 104.1-104.2 are connected to the storage server 108 via the computer network 106, such as a packet-switched network. Further, the storage server 108 is connected to the disk 112 via the switching fabric 110, such as a fiber distributed data interface (FDDI) network. It is noted that, within the network data storage environment 100, any other suitable numbers of storage servers and/or mass storage devices, and/or any other suitable network technologies, may be employed.

By way of background, the storage server 108 can make some or all of the storage space on the disk(s) 112 available to the client systems 104.1-104.2 in a conventional manner. For example, the disk(s) 112 can be implemented as an individual disk, several disks, a redundant array of independent disks (commonly referred to as a "RAID group"), or any other suitable mass storage device(s). Software running on the storage server 108 and other software running on the client systems 104.1-104.2 communicate according to well-known protocols, such as the Network File System (NFS) protocol or the Common Internet File System (CIFS) protocol, to make data stored on the disk 112 appear to users and/or application programs as though the data were stored locally on the client systems 104.1-104.2. The storage server 108 can present or export data stored on the disk 112 as a volume, or one or more sub-volume units referred to herein as "qtrees", to each of the client systems 104.1-104.2. Each volume is configured to store data files, scripts, word processing documents, executable programs, and the like. For example, the storage server 108 can include the NETAPP® DATA ONTAP® storage operating system, available from NetApp, Inc., that implements a Write Anywhere File Layout (WAFL®) file system, or any other suitable storage operating system. From the perspective of one of the client systems 104.1-104.2, each volume can appear to be a single disk drive. However, each volume can represent the storage space in one disk, an aggregate of some or all of the storage space in multiple disks, a RAID group, or any other suitable set of storage space.

Specifically, each volume can include a number of individually addressable files. For example, in a network attached storage (NAS) configuration, the files of a volume are addressable over the computer network 106 for file-based access. In addition, an aggregate is a fixed-sized volume built on top of a number of RAID groups containing one or more virtual volumes or FlexVol® flexible volumes. An aggregate is therefore a container for virtual or flexible volumes. Accordingly, there are generally two types of volumes, i.e., traditional volumes that are built directly on top of RAID groups, and virtual or flexible volumes that are built on aggregates, which in turn are built on top of RAID groups, which in turn are built on top of whole drives.

In a typical mode of operation, one of the client systems 104.1-104.2 transmits one or more input/output commands, such as an NFS or CIFS request, over the computer network 106 to the storage server 108 or a virtual storage server hosted by the storage server 108, which receives the request, issues one or more I/O commands over the switching fabric 110 to the disk 112 to read or write the data on behalf of the client system 104.1-104.2, and issues an NFS or CIFS response containing the requested data over the network 106 to the respective client system. It should be appreciated that the storage server 108 can be partitioned into a number of virtual storage servers for administrative purposes. Further, a fixed-sized volume (i.e., an aggregate) can be partitioned into a number of virtual or flexible volumes. Any suitable combination of storage servers, virtual storage servers, and volumes is possible, such as the storage server 108 with fixed-sized volumes, the storage server 108 with virtual or flexible volumes built on aggregates, a virtual storage server hosted by the storage server 108 with fixed-sized volumes, and a virtual storage server hosted by the storage server 108 with virtual or flexible volumes. It is noted that a client system can request a lock when requesting access to a file. Such a lock is an abstraction representing the right, either shared or exclusive, to access a particular range of the file or another shared resource. For example, locks for NFS versions 2 and 3 can be obtained using the Network Lock Manager (NLM) file locking protocol, as described below in section D.

B. Clustered Storage Server System

Figure 2:
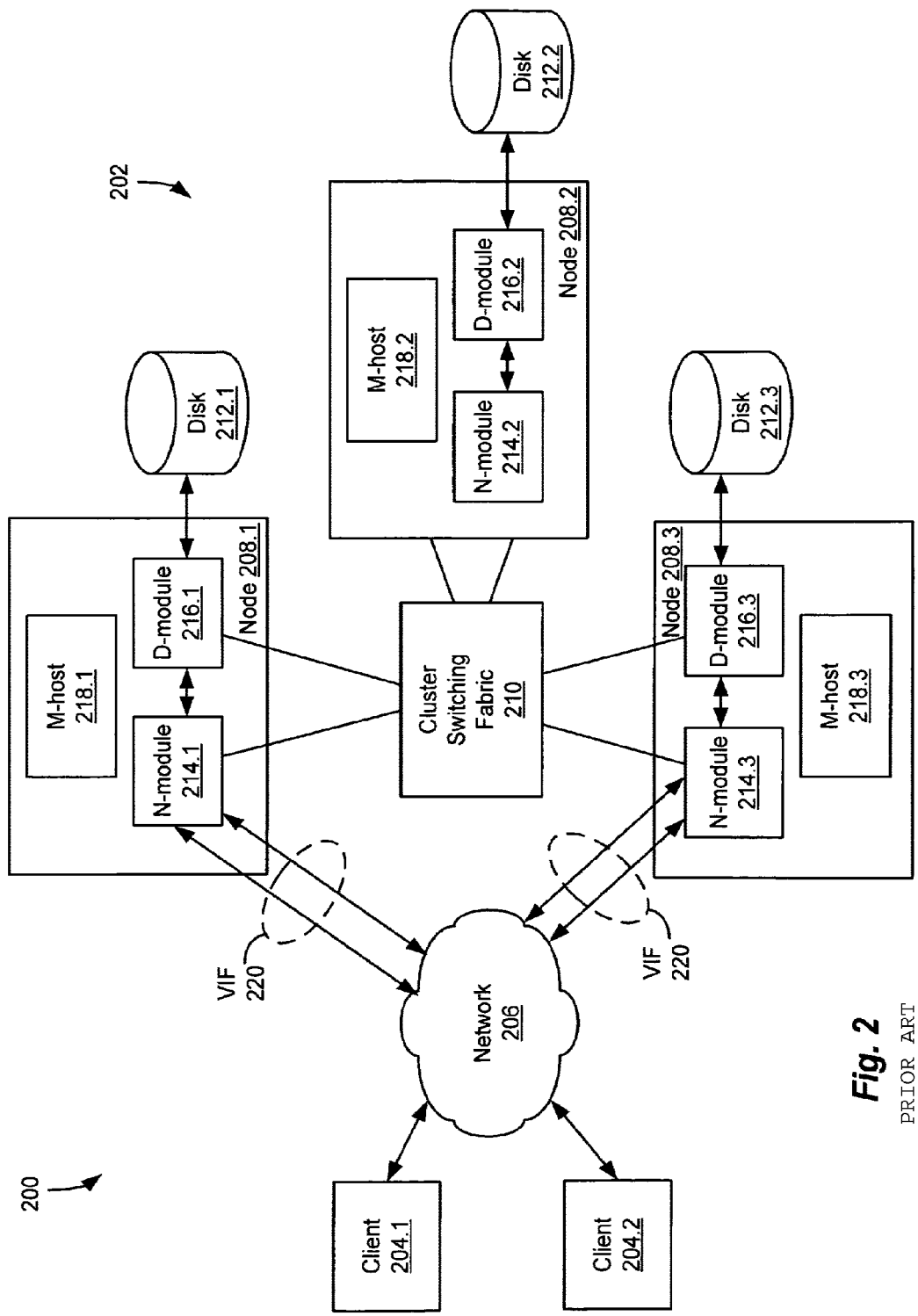
FIG. 2 is a block diagram of a clustered storage server system including a plurality of server nodes.

FIG. 2 depicts an illustrative embodiment of a network data storage environment 200, including a plurality of client systems 204.1-204.2, a clustered storage server system 202, and at least one computer network 206 communicably connecting the client systems 204.1-204.2 and the clustered storage server system 202. As shown in FIG. 2, the clustered storage server system 202 includes a plurality of server nodes 208.1-208.3, a cluster switching fabric 210, and a plurality of mass storage devices such as disks 212.1-212.3. For example, clustered storage server systems like the clustered storage server system 202 are available from NetApp, Inc. Each of the plurality of nodes 208.1-208.3 is configured to include an N-module, a D-module, and an M-host, each of which can be implemented as a separate software module. Specifically, the node 208.1 includes an N-module 214.1, a D-module 216.1, and an M-host 218.1, the node 208.2 includes an N-module 214.2, a D-module 216.2, and an M-host 218.2, and the node 208.3 includes an N-module 214.3, a D-module 216.3, and an M-host 218.3. The N-modules 214.1-214.3 include functionality that enables the respective nodes 208.1-208.3 to connect to one or more of the client systems 204.1-204.2 over the computer network 206, while the D-modules 216.1-216.3 connect to one or more of the disks 212.1-212.3. The M-hosts 218.1-218.3 provide management functions for the clustered storage server system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective N-modules 214.1-214.3 and the client systems 204.1-204.2, allowing the disks 212.1-212.3 associated with the nodes 208.1-208.3 to be presented to the client systems 204.1-204.2 as a single shared storage pool. For example, the switched virtualization layer may implement a virtual interface architecture. Such virtual interfaces are described in the DATA ONTAP® 6.1 SYSTEM ADMINISTRATOR'S GUIDE, the contents of which are hereby incorporated herein by reference in its entirety. FIG. 2 depicts only the VIFs 220 at the interfaces to the N-modules 214.1, 214.3 for clarity of illustration.

It is noted that the clustered storage server system 202 can be organized into any suitable number of virtual servers (vservers), in which each vserver represents a single file system namespace with separate network access. Each vserver has a user domain and a security domain that are separate from the user and security domains of other vservers. Moreover, each vserver is associated with one or more VIFs and can span one or more physical nodes, each of which can hold one or more VIFs and storage associated with one or more vservers. Client systems can access the data on a vserver from any node of the clustered system, but only through the VIFs associated with that vserver.

Each of the nodes 208.1-208.3 is defined as a computer adapted to provide application services to one or more of the client systems 204.1-204.2. In this context, a vserver is an instance of an application service provided to a client system. The nodes 208.1-208.3 are interconnected by the switching fabric 210, which, for example, may be embodied as a Gigabit Ethernet switch. Although FIG. 2 depicts an equal number (i.e., 3) of the N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage server system 202. For example, in alternative embodiments, the clustered storage server system 202 may include a plurality of N-modules and a plurality of D-modules interconnected in a configuration that does not reflect a one-to-one correspondence between the N-modules and D-modules. The clustered storage server system 202 can include the NETAPP® DATA ONTAP® storage operating system, available from NetApp, Inc., that implements the WAFL® file system, or any other suitable storage operating system.

The client systems 204.1-204.2 of FIG. 2 may be implemented as general-purpose computers configured to interact with the respective nodes 208.1-208.3 in accordance with a client/server model of information delivery. In the presently disclosed embodiment, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the Network File System (NFS) protocol or the Common Internet File System (CIFS) protocol, when accessing information in the form of files and directories.

In a typical mode of operation, one of the client systems 204.1-204.2 transmits an NFS or CIFS request for data to one of the nodes 208.1-208.3 within the clustered storage server system 202, and the VIF 220 associated with the respective node receives the client request. It is noted that each VIF 220 within the clustered system 202 is a network endpoint having an associated IP address, and that each VIF can migrate from N-module to N-module. The client request typically includes a file handle for a data file stored in a specified volume on one or more of the disks 212.1-212.3. Specifically, each volume comprises a file system subtree that includes an index node file (an inode file) having a root inode, and a set of directories and files contained under the root inode. Each inode is a data structure allocated for a respective data file to store metadata that describes the data file. For example, an inode can contain data and pointers for use in facilitating access to blocks of data within the data file, and each root inode can contain pointers to a number of inodes. In addition, an aggregate is a fixed-sized volume built on top of a number of RAID groups containing one or more virtual volumes or FlexVol® flexible volumes. An aggregate is therefore a container for virtual or flexible volumes. Accordingly, there are generally two types of volumes, i.e., traditional volumes that are built directly on top of RAID groups, and virtual or flexible volumes that are built on aggregates, which in turn are built on top of RAID groups, which in turn are built on top of whole drives.

Figure 3A:
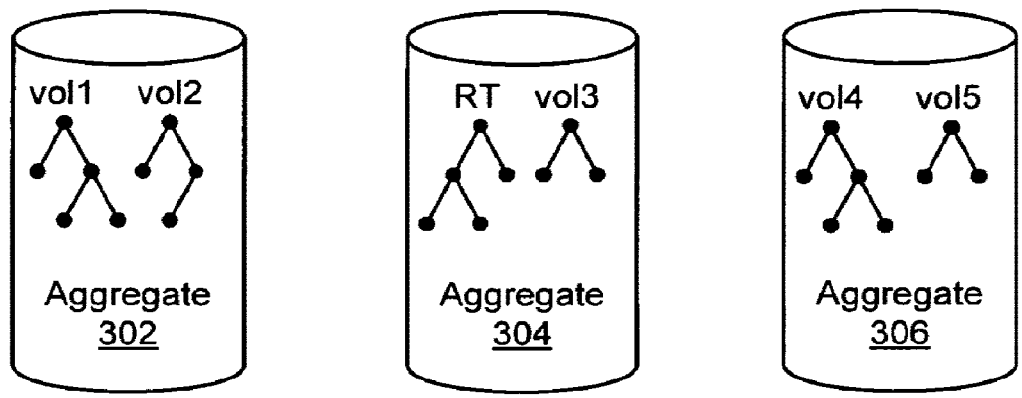
FIG. 3a is a diagram illustrating three aggregates included in the clustered storage server system of FIG. 2.

FIG. 3*a* depicts three exemplary aggregates 302, 304, 306, which can be stored on one or more of the disks 212.1-212.3 of the clustered storage server system 202 (see FIG. 2). As shown in FIG. 3*a*, each of the aggregates 302, 304, 306 contains two representative volumes, in which each volume comprises a file system subtree. Specifically, the aggregate 302 contains two volumes vol1, vol2, the aggregate 304 contains two volumes RT, vol3, and the aggregate 306 contains two volumes vol4, vol5. In the clustered storage server system 202, the names of the volumes from the plurality of nodes 208.1-208.3 are linked into a virtual global hierarchical namespace, allowing the client systems 204.1-204.2 to mount the volumes from various ones of the nodes 208.1-208.3 with a high level of flexibility.

Figure 3B:
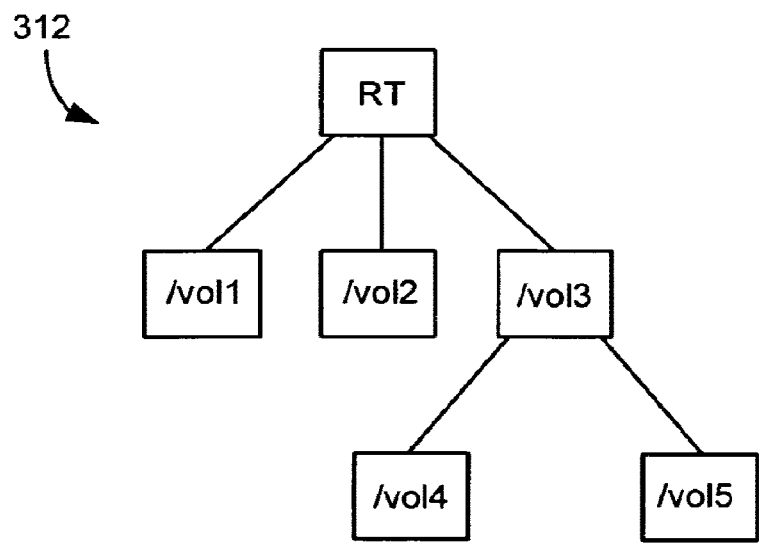
FIG. 3b is a diagram illustrating a virtual global hierarchical namespace composed of a plurality of volumes stored on the clustered storage server system of FIG. 2.

FIG. 3b depicts an exemplary global namespace 312 composed of the volumes RT, vol1, vol2, vol3, vol4, vol5. In the global namespace 312, each volume RT, vol1-vol5 represents a virtualized container storing a portion of the global namespace 312 descending from a single root directory. The volumes RT, vol1-vol5 are linked together in the global namespace 312 through a number of junctions. A junction is an internal mount point which, to a client, resolves to a directory (which would be the root directory of the target volume). Such a junction can appear anywhere in a volume, and can link a volume to the root directory of another volume. For example, in the clustered system 202, a junction in the volume vol3 associated with the D-module 216.2 links that volume to the root directory of the volume vol4, which is associated with the D-module 216.3. A junction can therefore link a volume on one of the D-modules 216.1-216.3 to another volume on a different one of the D-modules 216.1-216.3. As shown in FIG. 3b, the global namespace 312 includes the volume RT (i.e., the root volume), which has three junctions linking the volume RT to the volumes vol1, vol2, vol3. The global namespace 312 further includes the volume vol3, which has two junctions linking the volume vol3 to the volumes vol4, vol5.

The use of junctions for linking together multiple volumes in a global namespace of a clustered storage server system is further described in U.S. patent application Ser. No. 11/499,493 filed Aug. 4, 2006 entitled ENABLING A CLUSTERED NAMESPACE WITH REDIRECTION, U.S. patent application Ser. No. 12/129,904 filed May 30, 2008 entitled PROVIDING AN ADMINISTRATIVE PATH FOR ACCESSING A WRITEABLE MASTER STORAGE VOLUME IN A MIRRORED STORAGE ENVIRONMENT, and U.S. patent application Ser. No. 11/680,255 filed Feb. 28, 2007 entitled SYSTEM AND METHOD FOR ENABLING A DATA CONTAINER TO APPEAR IN A PLURALITY OF LOCATIONS IN A SUPER-NAMESPACE, each of which is assigned to and commonly owned by the same assignee as the present invention, and each of which is hereby incorporated herein by reference in its entirety. In the context of the present invention, a global namespace of a clustered network data storage system is extended to include not only the volumes stored on the clustered system, but also the volumes of one or more remote network data storage systems, which are not part of the clustered system.

As discussed above, one of the client systems 204.1-204.2 (see FIG. 2) transmits a client request, such as an NFS or CIFS request, for data on a target volume to one of the nodes 208.1-208.3 within the clustered storage server system 202, and the VIF 220 associated with the respective node receives the client request. The N-module included in that node then processes the client request, translating the request into a Remote Procedure Call (RPC) using an internal protocol, such as the SpinNP protocol available from NetApp, Inc. Next, the N-module transmits the SpinNP RPC over the cluster switching fabric 210 to the node that includes the D-module associated with the target volume. To that end, the N-module accesses a volume location database (VLDB), which is a database stored on each of the plurality of nodes 208.1-208.3 that tracks the identities of the aggregates containing the volumes from the plurality of nodes, and the identities of the D-modules associated with the respective aggregates. The N-module consults the VLDB to obtain the identity and location of the D-module to which the SpinNP RPC is to be transmitted. Upon receipt of the SpinNP RPC, the D-module of the node responsible for the target volume processes the RPC.

For example, in the event the client system 204.1 transmits, to the node 208.1, an NFS or CIFS request including a file handle for a data file stored on the volume vol4, the N-module 214.1 on the node 208.1 extracts the file handle from the request, and extracts a first identifier, namely, a Master Data Set Identifier (MSID), of the volume vol4 from the file handle. Each MSID specifies a volume or a set of mirrors of the same volume. Next, the N-module 214.1 uses the MSID of the volume vol4 to index into a volume table contained in the VLDB, which maps the MSID into a second identifier of the volume vol4, namely, a Data Set Identifier (DSID). Each DSID uniquely specifies a copy of a single volume. The N-module 214.1 then uses the DSID of the volume vol4 to lookup the IP address of the D-module 216.3 associated with the aggregate 306 storing the volume vol4, and transmits an internal SpinNP request including an internal file handle with the DSID of the volume vol4 to that IP address. Next, the D-module 216.3 extracts the file handle from the SpinNP request, and, using the DSID, accesses the requested data file on the volume vol4 stored on the aggregate 306. The D-module 216.3 then transmits an internal SpinNP response containing the requested data to the N-module 208.1, which, in turn, transmits an NFS or CIFS response containing the requested data to the client system. It is noted that the client system can request a lock when requesting access to a file. Such locks for NFS versions 2 and 3 can be obtained using the NLM file locking protocol, as described below in section D.

As described above, the volumes RT, vol1-vol5 are linked into the global namespace 312 (see FIG. 3b) by a number of junctions. Information pertaining to each of these junctions is stored as an entry in a junction table maintained by the VLDB. Specifically, each entry of the junction table includes information pertaining to a mounting relationship defined by a parent volume, a child volume, and a respective junction. For example, for the volume vol4, the junction table stores a junction entry including information pertaining to the mounting relationship defined by the parent volume vol3, the child volume vol4, and the junction in the parent volume vol3 leading to the child volume vol4. Similarly, for the volume vol5, the junction table stores a junction entry including information pertaining to the mounting relationship defined by the parent volume vol3, the child volume vol5, and the junction in the parent volume vol3 leading to the child volume vol5. Each of these junctions, which are identified by their inode and generation numbers, functions as an internal mount point in the parent volume vol3 for the child volumes vol4, vol5. Each of the volumes RT, vol1-vol5 in the global namespace 312 can include one or more junctions, each corresponding to an entry in the junction table.

Accordingly, in the event one of the client system 204.1-204.2 (see FIG. 2) transmits, to one of the nodes 208.1-208.3, an NFS or CIFS request including an object name that corresponds to a junction, the N-module on that node uses the inode and generation number of that junction to index into the junction table, which maps the junction into the MSID of the associated child volume. For example, if the client system transmits a client request to a server node that includes an object name corresponding to the junction leading to the volume vol4, then the N-module on that node queries the junction table to find the MSID of the volume vol4. Next, the N-module indexes into the volume table using the MSID of the volume vol4 to find the DSID of the volume vol4. The N-module then uses the DSID of the volume vol4 to lookup the IP address of the D-module associated with the aggregate storing the volume vol4, and communicates with the D-module to access, using the DSID of the volume vol4, the volume data requested by the client system. The N-module then exports the requested volume data to the client system in an NFS or CIFS response.

C. Storage Server System Employing Extended Global Namespace

Figure 4:
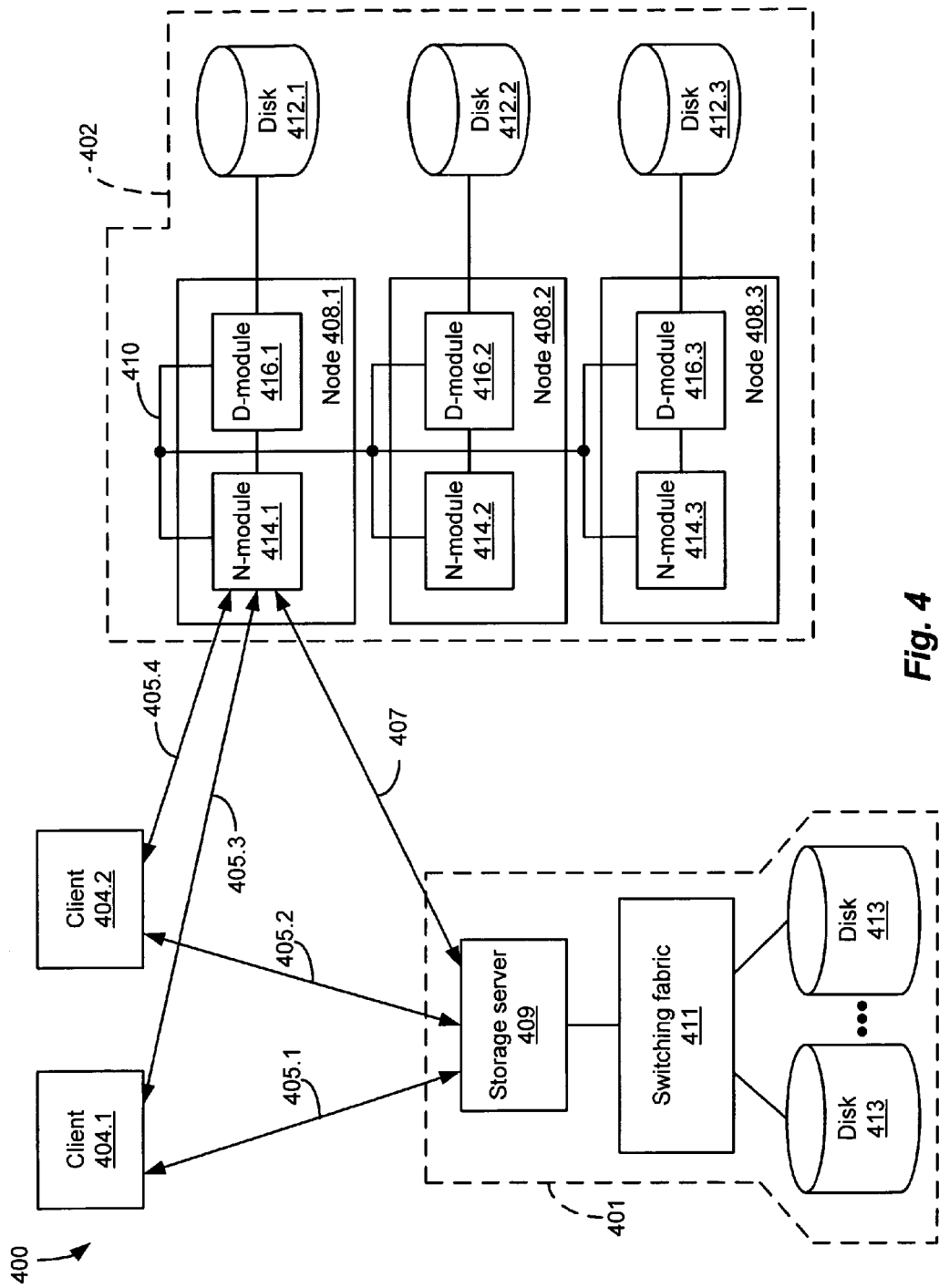
FIG. 4 is a block diagram of a network data storage environment including a clustered storage server system and at least one remote storage server, according to the present invention.

FIG. 4 depicts an illustrative embodiment of a network data storage environment 400, including a storage server system 401 and a clustered storage server system 402, in accordance with the present invention. The network data storage environment 400 provides users of the storage server system 401 with the ability to gain the advantages of the clustered storage server system 402, in which volumes from multiple server nodes are linked into a virtual global hierarchical namespace, without first having to migrate their data from the storage server system 401 to the clustered storage server system 402. In the clustered storage server system 402, the global namespace is extended to allow access to one or more remote volumes stored within the storage server system 401 over one or more network pathways disposed between the clustered storage server system 402 and the storage server system 401.

As shown in FIG. 4, the network data storage environment 400 includes a plurality of client systems 404.1-404.2, a plurality of network pathways 405.1-405.4 disposed between the client systems 404.1-404.2, the storage server system 401, and the clustered storage server system 402, and at least one network pathway 407 disposed between the storage server system 401 and the clustered storage server system 402. Like the storage server system 102 (see FIG. 1), the storage server system 401 includes a storage server 409, at least one mass storage device such as a disk 413, and a switching fabric 411 interconnecting the storage server 409 and the disk 413. For example, the client systems 404.1-404.2 are communicably connectable to the storage server 409 over the network pathways 405.1-405.2, respectively. The clustered storage server system 402 includes a plurality of server nodes 408.1-408.3, a cluster switching fabric 410, and a plurality of mass storage devices such as disks 412.1-412.3. Each of the client systems 404.1-404.2 is communicably connectable to each one of the nodes 408.1-408.3 over a suitable network pathway. For example, the client systems 401.1-401.2 are connectable to the node 408.1 over the network pathways 405.3-405.4, respectively. Each of the plurality of nodes 408.1-408.3 is configured to include an N-module, a D-module, and an M-host, each of which can be implemented as a software module. It is noted that FIG. 4 depicts only the N-module and the D-module within each of the nodes 408.1, 408.3 for clarity of illustration.

Specifically, the node 408.1 includes an N-module 414.1 and a D-module 416.1, the node 408.2 includes an N-module 414.2 and a D-module 416.2, and the node 408.3 includes an N-module 414.3 and a D-module 416.3. The N-modules 414.1-414.3 include functionality that enables the respective nodes 408.1-408.3 to connect to one or more of the client systems 404.1-404.2 over suitable network pathways, while the D-modules 416.1-416.3 connect to the disks 412.1-412.3, respectively. The M-hosts (not shown) provide management functions for the clustered storage server system 402. Each of the plurality of server nodes 408.1-408.3 in the clustered storage server arrangement therefore provides the functionality of a storage server. The clustered system 402 is also communicably connectable to the storage server system 401 via the network pathway 407. It is noted that a switched virtualization layer including a plurality of VIFs is provided below the interface between the respective N-modules 414.1-414.3 and the client systems 404.1-404.2. It is further noted that the clustered storage server system 402 can be organized into any suitable number of virtual servers (vservers).

Although the network data storage environment 400 of FIG. 4 includes the two client systems 404.1-404.2, the storage server system 401 including the single storage server 409, and the clustered storage server system 402 including the three nodes 408.1-408.3, it is understood that any suitable numbers of client systems, storage servers, server nodes, vservers, and/or virtual storage servers may be employed. It is also understood that, in alternative embodiments, the clustered storage server system 402 may include a plurality of N-modules and a plurality of D-modules interconnected in a configuration that does not reflect a one-to-one correspondence between the N-modules and D-modules. The clustered storage server system 402 can include the NETAPP® DATA ONTAP® storage operating system, available from NetApp, Inc., that implements the WAFL® storage system, or any other suitable storage operating system.

As described above, the network data storage environment 400 of FIG. 4 provides users of the storage server system 401 with the ability to gain the advantages of the clustered storage server system 402, in which volumes stored on the disks 412.1-412.3 are linked into a virtual global hierarchical namespace, without first having to migrate their data from the storage server system 401 to the clustered storage server system 402. In one embodiment, the global namespace of the clustered storage server system 402 is extended to allow the client systems 404.1-404.2 to access volumes stored on the disk 413 of the remote storage server 409 (or a virtual storage server) by transmitting a client request, such as a Network File System version 3 Protocol (NFSv3) request, for data to one of the nodes 408.1-408.3 within the clustered system 402, such as the node 408.1, which accesses the requested data over the network pathway 407 to the remote storage server 409, and issues an NFSv3 response containing the requested data over the appropriate network pathway 405.3, 405.4 to the client system. In effect, the server node of the clustered system 402 functions as an intermediary between the client systems 404.1-404.2 and the remote storage server 409, when one of the client systems 404.1-404.2 transmits an NFSv3 request to that node for data on a volume of the remote storage server 409. In one embodiment, an affiliation between a volume of the remote storage server 409 and the clustered system 402 is established via the extended global namespace within the context of a virtual server. It is understood that the client systems 404.1-404.2 can also access volumes of the remote storage server 409 (or a virtual storage server) directly over the network pathways 405.1-405.2, respectively, in a conventional manner.

Figure 5A:
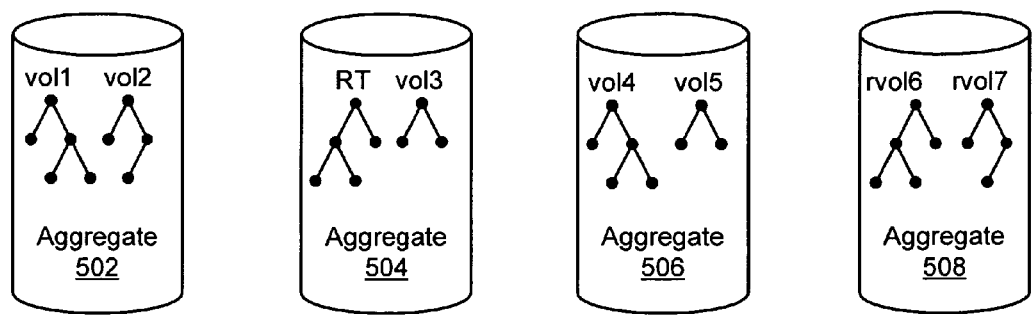
FIG. 5a is a diagram illustrating three exemplary aggregates included in the clustered storage server system of FIG. 4, and one exemplary aggregate of the remote storage server of FIG. 4.

The operation of a server node within the clustered storage server system 402 as an intermediary between the client systems 404.1-404.2 and the storage server 409 will be better understood with reference to the discussion below and FIGS. 5a-5e. FIG. 5a depicts four exemplary aggregates 502, 504, 506, 508. The aggregates 502, 504, 506 can be stored on one or more of the disks 412.1-412.3 of the clustered storage server system 402, and the aggregate 508 can be stored on one or more of the disks 413 of the storage server system 401. Like the aggregates 302, 304, 306 of FIG. 3a, each of the aggregates 502, 504, 506, 508 of FIG. 5a contains two representative volumes, in which each volume comprises a storage system subtree. Specifically, the aggregate 502 contains two volumes vol1, vol2, the aggregate 504 contains two volumes RT, vol3, the aggregate 506 contains two volumes vol4, vol5, and the aggregate 508 contains two volumes rvol6, rvol7.

Figure 5B:
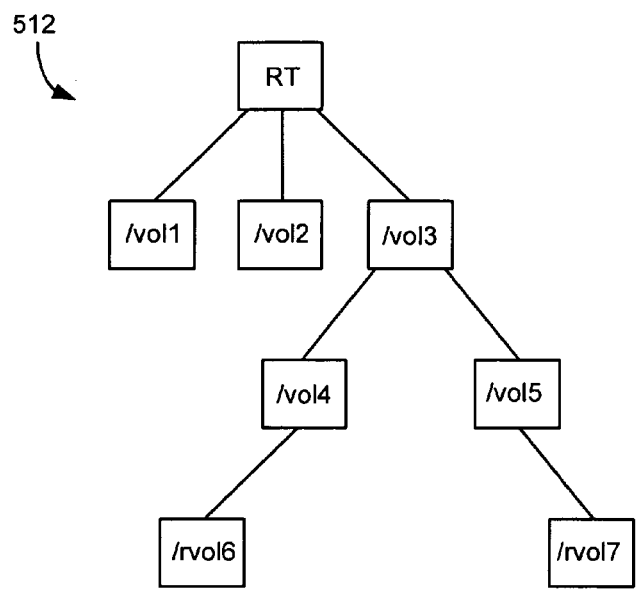
FIG. 5b is a diagram illustrating an extended virtual global hierarchical namespace composed of a plurality of volumes stored on the clustered storage server system and on the remote storage server of FIG. 4.

FIG. 5b depicts an exemplary virtual global hierarchical namespace 512 composed of the volumes RT, vol1, vol2, vol3, vol4, vol5, rvol6, rvol7. The global namespace 512 of FIG. 5b is like the global namespace 312 of FIG. 3b with the exception that the global namespace 512 is extended to allow the client systems 404.1-404.2 to access the volumes RT, vol1, vol2, vol3, vol4, vol5 contained in the aggregates 502, 504, 506 stored on the clustered storage server system 402, and the volumes rvol6, rvol7 contained in the aggregate 508 stored on the remote storage server 409. The volumes vol1, vol2, vol3, vol4, vol5, rvol6, rvol7 are linked into the global namespace 512 through junctions. From the perspective of a client system, each junction appears as a normal directory in the global namespace 512 exported by the clustered system 402. For example, in the global namespace 512, the volume RT (i.e., the root volume) has three junctions linking the root volume to the volumes vol1, vol2, vol3, and the volume vol3 has two junctions linking the volume vol3 to the volumes vol4, vol5. Further, in the global namespace 512, the volume vol4 has one junction linking the volume vol4 to the volume rvol6, and the volume vol5 has one junction linking the volume vol5 to the volume rvol7.

Figure 5C:
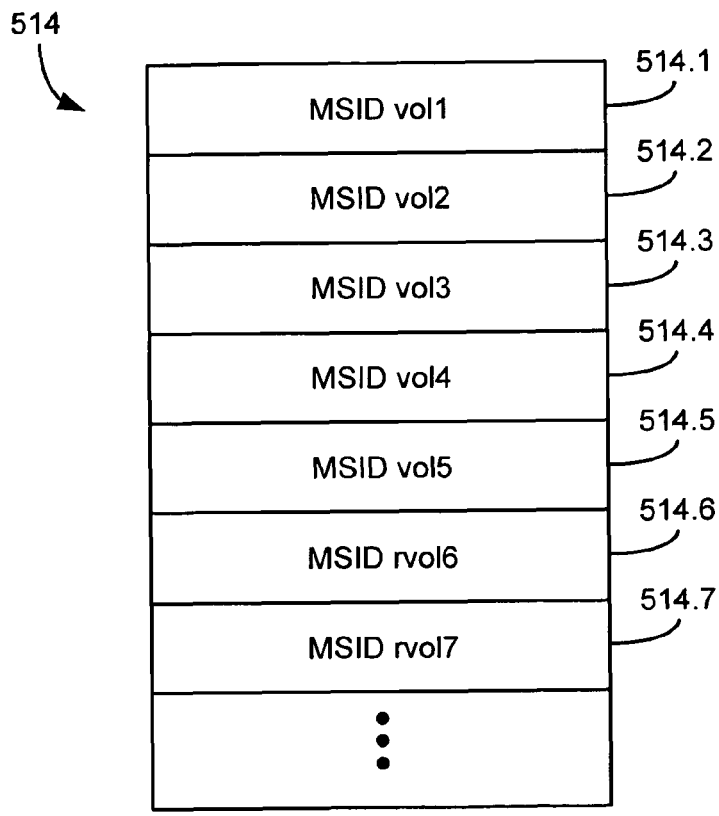
FIG. 5c is a junction table containing entries for junctions corresponding to internal mount points for the volumes linked into the extended global namespace of FIG. 5b.

Information pertaining to each junction is stored as an entry in a junction table 514, as depicted in FIG. 5c. The junction table 514 is maintained by the VLDB. Specifically, each entry of the junction table 514 corresponds to a mounting relationship defined by a parent volume, a child volume, and a respective junction acting as an internal mount point for the child volume. For example, for the volume vol1, the junction table 514 stores a first entry 514.1 corresponding to the mounting relationship defined by the parent volume RT, the child volume vol1, and the junction in the parent volume RT leading to the child volume vol1. Similarly, the junction table 514 stores second and third entries 514.2, 514.3 corresponding to the mounting relationships for the volumes vol2, vol3. Further, for the volume vol4, the junction table 514 stores a fourth entry 514.4 corresponding to the mounting relationship defined by the parent volume vol3, the child volume vol4, and the junction in the parent volume vol3 leading to the child volume vol4. Similarly, the junction table 514 stores a fifth entry 514.5 corresponding to the mounting relationship for the volume vol5. Moreover, for the volume rvol6, the junction table 514 stores a sixth entry 514.6 corresponding to the mounting relationship defined by the parent volume vol4, the child volume rvol6, and the junction in the parent volume vol4 leading to the child volume rvol6. Similarly, for the volume rvol7, the junction table 514 stores a seventh entry 514.7 corresponding to the mounting relationship defined by the parent volume vol5, the child volume rvol7, and the junction in the parent volume vol5 leading to the child volume rvol7. As shown in FIG. 5c, each of the entries 514.1-514.7 of the junction table 514 includes the MSID of the associated child volume.

Figure 5D:
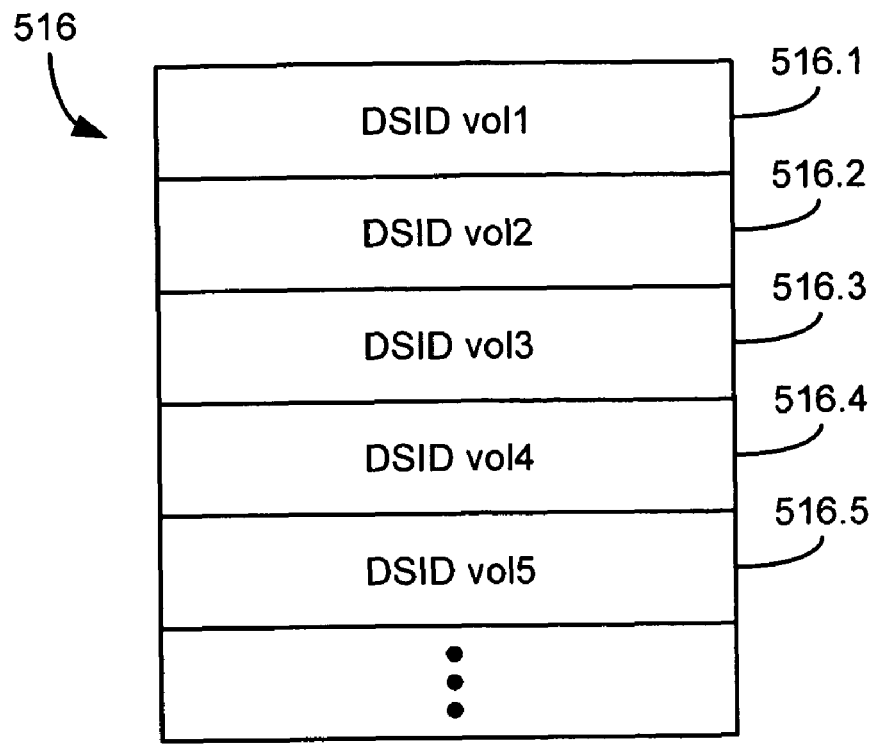
FIG. 5d is a volume table containing entries for volumes of the clustered storage server system of FIG. 4.
Figure 5E:
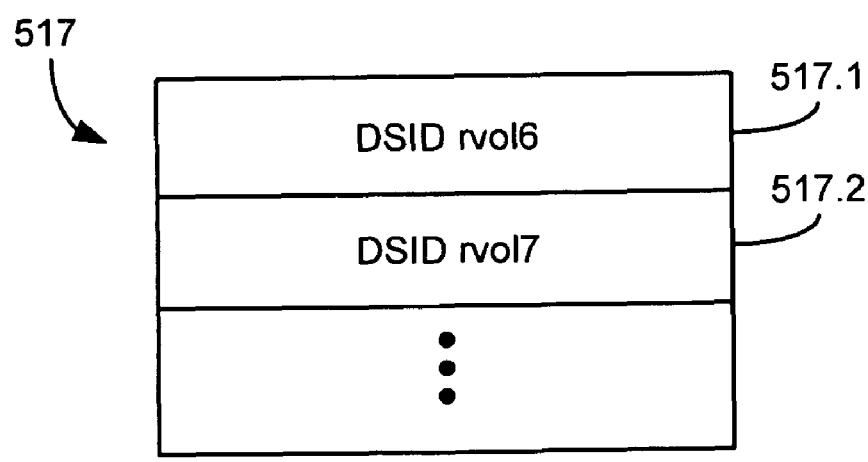
FIG. 5e is a volume table containing entries for volumes of the remote storage server of FIG. 4.

In addition, information pertaining to the mapping of each respective MSID of a volume into a corresponding Data Set Identifier (DSID) is stored as an entry in either a volume table 516, as depicted in FIG. 5d, or a volume table 517, as depicted in FIG. 5e. In the presently disclosed embodiment, each entry of the volume table 516 maps the MSID into one or more DSIDs of respective volumes of the clustered storage server system 402, and each entry of the volume table 517 maps the MSID into one or more DSIDs of respective volumes of the storage server system 401. Each DSID uniquely specifies a copy of a single volume. As shown in FIG. 5d, each entry of the volume tables 516, 517 includes the DSID of the associated volume. For example, the volume table 516 stores a first entry 516.1 including the DSID associated with the volume vol1, a second entry 516.2 including the DSID associated with the volume vol2, a third entry 516.3 including the DSID associated with the volume vol3, a fourth entry 516.4 including the DSID associated with the volume vol4, and a fifth entry 516.5 including the DSID associated with the volume vol5. As shown in FIG. 5e, the volume table 517 stores a first entry 517.1 including the DSID associated with the volume rvol6, and a second entry 517.2 including the DSID associated with the volume rvol7.

It is noted that, on each of the plurality of nodes 408.1-408.3, the junction table 514 and the volume tables 516, 517 are stored in and maintained by a volume location database (VLDB). The VLDB also stores and maintains two additional tables, namely, a first table storing detailed identity and location information relating to each storage server of the storage server system 401 that is accessible via an intermediary node of the clustered storage server system 402 (e.g., a netbios name for a CIFS service, a network name for an NFS service, an identifying name for a corresponding intermediary node on the clustered system, and a node number for the intermediary node), and a second table storing detailed identity and location information relating to each volume of the remote storage server accessible via the intermediary node (e.g., the MSID and DSID of the volume, a CIFS share name for the remote storage server, and an NFS export name for the remote storage server). In one embodiment, an affiliation between the remote storage server 409 and the clustered system 402 is established via the extended global namespace, in which the remote storage server 409 is integrated into the clustered system 402 as a non-voting member.

For example, in the event a user of the client system 404.1 (see FIG. 4) wishes to access a data file stored on the volume rvol6 of the storage server 409, using the node 408.1 of the clustered storage server system 402 as an intermediary node, the client system 404.1 first mounts the global namespace 512. It is noted that each vserver within the clustered storage server system 402 can present its own independent namespace, each rooted at a separate root volume. Further, each vserver within the clustered system 402 can be accessed via one or more VIFs having one or more associated IP addresses, and the VIFs can migrate among the N-modules 414.1-414.3. Next, the client system 404.1 transmits, to the VIF on the N-module 414.1, an NFSv3 request for the data file stored on the volume rvol6. As the N-module 414.1 traverses the global namespace 512 to find the MSID of the volume rvol6, the N-module 414.1 encounters the junctions for the volumes vol3, vol4, and the junction for the volume rvol6. The N-module 414.1 indexes into the junction table 514, using the inode and generation numbers, to find the MSID of the volume rvol6 contained in the junction table entry 514.6. In addition, the N-module 414.1 indexes into the volume table 517, using the MSID of the volume rvol6, to find the DSID of the volume rvol6 contained in the volume table entry 517.1. The N-module 414.1 then communicates with the storage server 409 to access data on the volume rvol6, as requested by the client system 404.1.

Whereas the N-module 414.1 can communicate with the D-modules 416.1-416.3 using the internal SpinNP protocol, as described above with reference to the clustered storage server system 202 (see FIG. 2), the N-module 414.1 can communicate with the storage server 409 over the network pathway 407 using a forwarding-based protocol employing a tunneling approach (see section D below) to enable the proxying of NFSv3 and related locking requests through the node 408.1 serving as an intermediary, or a forwarding-based protocol employing a client mapping approach (see section E below) to map the client ID to a unique N-module port interfacing the N-module to the network pathway 407. It is noted that while the client mapping approach of the forwarding-based protocol requires persistent state information to be stored on an intermediate N-module or D-module of the clustered system, the tunneling approach of the forwarding-based protocol does not require storage of persistent state information. It is understood that each of the N-modules 414.2-414.3 can communicate with the storage server 409 over a network pathway using the forwarding-based protocol based on either the tunneling approach or the client mapping approach.

D. Forwarding-Based Protocol—Tunneling Approach

Figure 6:
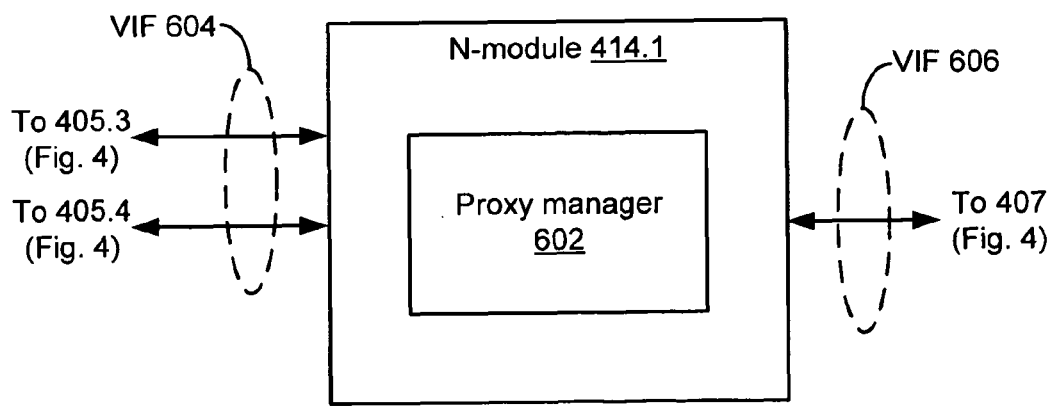
FIG. 6 depicts an N-module included in the clustered storage server system of FIG. 4, in which the N-module includes a proxy manager component for implementing a forwarding-based protocol for accessing a data file stored on a volume of the remote storage server of FIG. 4.

FIG. 6 depicts an illustrative embodiment of the N-module 414.1 included in the server node 408.1 within the clustered storage server system 402 (see FIG. 4). As shown in FIG. 6, the N-module 414.1 includes a proxy manager component 602, which is a software module operative to implement the forwarding-based protocol (tunneling approach or client mapping approach) for manipulating (i.e., reading or writing) data stored on a volume of the remote storage server 409. It is noted that each of the N-modules 414.1-414.3 of the server nodes 408.1-408.3, respectively, can include a proxy manager component for implementing the forwarding-based protocol.

Figure 7A:
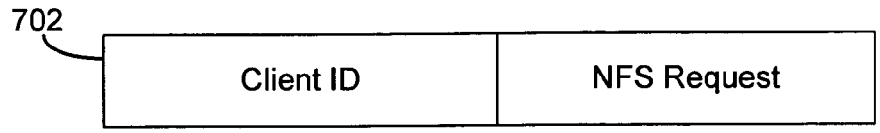
FIGS. 7a-7e illustrate a forwarding-based protocol employing a tunneling approach, which is implemented by the proxy manager of FIG. 6 for forwarding NFSv3 client requests from a clustered storage server system to a remote storage server.

In one embodiment, the N-module 414.1 communicates with the remote storage server 409 over the network pathway 407 using the tunneling approach of the forwarding-based protocol as follows. First, the N-module 414.1 receives a request from a client system (i.e., the client system 404.1 or 404.2) for reading data from or writing data to a data file stored on a volume of the storage server 409, according to the NFSv3 protocol. FIG. 7a depicts an exemplary NFSv3 client request 702, which is a Remote Procedure Call (RPC) including a Client ID and an NFS Request, i.e., a command to read data from or write data to the remote volume. In accordance with the NFSv3 protocol, the Client ID includes the client IP address and the client port number, and the NFS Request includes a transaction identifier (XID). The Client ID and XID uniquely identify the NFSv3 request 702. It is understood that the NFSv3 request 702 can also include a file handle for the data file that is compliant with the clustered storage server system 402. The file handle can include the MSID and the inode information corresponding to the remote volume. Next, the proxy manager 602 within the N-module 414.1 substitutes the file handle included in the client request with a new file handle that is compliant with the storage server 409. To that end, the proxy manager 602 employs the MSID and the inode information from the file handle supplied by the client system along with the corresponding file server identification (FSid) from the VLDB to generate the new file handle compliant with the storage server 409. The proxy manager 602 then generates a new NFSv3 request (referred to hereinafter as a "tunneled NFS request") to the storage server 409, passing the new file handle with the tunneled NFS request.

Figure 7B:
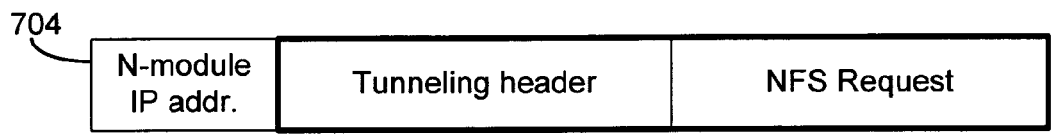

FIG. 7b depicts an exemplary tunneled NFS request 704, which includes an encapsulated Tunneling header and an encapsulated copy of the NFS Request. The tunneled NFS request 704 further includes the IP address and port number of the N-module as part of the communication protocol connection between the remote storage server 409 and the N-module 414.1. It is understood that each RPC request (and each RPC response) has an implicit source and destination port and IP address. In the tunneled NFS request 704, the Tunneling header includes the client IP address, the client port number, an identifier of the VIF through which the NFSv3 client request 702 was received (e.g., the IP address of the VIF 604 on the N-module 414.1), and authentication information for authenticating the client system. It is noted that because the tunneled NFS request 704 includes the original Client ID, no persistent state information is required to be stored on an intermediate N-module or D-module. The N-module 414.1 transmits or forwards, over the network pathway 407, the tunneled NFS request 704 to the storage server 409, which picks off the N-module IP address, and extracts the encapsulated Tunneling header, including the client IP address and port number, and the encapsulated NFS Request.

It is noted that the remote storage server 409 contains a replay cache for storing copies of non-idempotent data write requests received directly from the client systems 404.1-404.2 over the network pathways 405.1-405.2, respectively, and received via the intermediary node 408.1 of the clustered storage server system 402 over the network pathway 407. The replay cache of the storage server 409 can identify a data write request using the identity of the client system (the client IP address and port number), the transaction ID of the request (XID), the identity of the virtual storage server where the client request was received, and other characteristics of the request for verification (e.g., PROC, VER, checksum of the request). It is possible for a client system to re-transmit a request multiple times, for example, for the purpose of handling lost requests. In such situations, the replay cache will guarantee the idempotency of requests by identifying requests that have already been processed, and assuring that non-idempotent requests are executed only once.

Figure 7C:
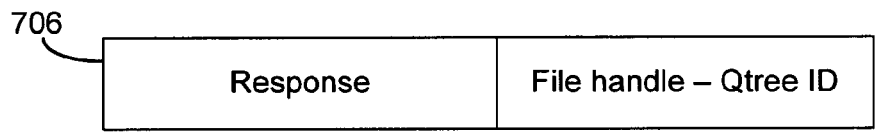

Next, the remote storage server 409 passes the extracted client ID (i.e., the client IP address and port number) and NFS Request to the NFSv3 layer of the storage server 409, and then to the WAFL layer of the storage server 409 to read data from or write data to the data file stored on the remote volume. The storage server 409 then generates an NFSv3 response. In the event the client request was a data read request, the NFSv3 response contains the requested data from the remote volume of the storage server 409. FIG. 7c depicts an exemplary NFSv3 response 706, which is an RPC including the Response. It is noted that the NFSv3 response 706 can also include one or more File handles compliant with the storage server 409, and that one or more of the File handles can optionally include a Qtree ID for identifying a sub-volume unit. A new NFSv3 response (referred to hereinafter as a "tunneled NFS response") to the N-module 414.1 is then generated, passing the File handle and the Qtree ID with the tunneled NFS response.

Figure 7D:
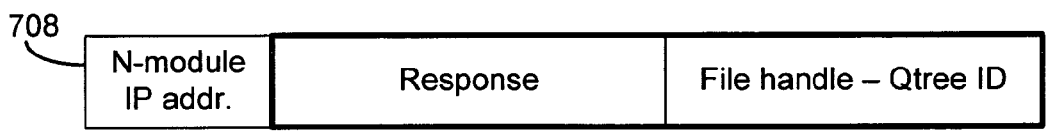

FIG. 7d depicts an exemplary tunneled NFS response 708, which includes an encapsulated copy of the Response, and optionally an encapsulated copy of the File handle/Qtree ID. The tunneled NFS response 708 further includes the IP address and port number of the N-module as part of the communication protocol connection between the remote storage server 409 and the N-module 414.1. The storage server 409 transmits, over the network pathway 407, the tunneled NFS response 708 to the N-module 414.1. Next, the proxy manager 602 within the N-module 414.1 extracts the Response from the encapsulated copy of the Response, and extracts the File handle/Qtree ID from the encapsulated copy of the File handle/Qtree ID. The proxy manager 602 then substitutes the File handle included in the tunneled NFS response 708 with a new file handle that is compliant with the clustered storage server system 402. To that end, the proxy manager 602 can employ the file server identification (FSid) information and the inode information from the File handle, the Qtree ID, and the MSID from the VLDB's volume table to generate the new file handle compliant with the clustered system 402.

Figure 7E:

Next, the proxy manager 602 generates a response to the client system, passing the file handle of the clustered storage server system 402 with the response. FIG. 7e depicts an exemplary client response 710, which is an RPC including the Client ID (i.e., the client IP address and port number) and the NFS Response. Like the client request 702, the client response 710 is generated according to the NFSv3 protocol. The N-module 414.1 then transmits, over the appropriate network pathway 405.3-405.4, the client response 710 to the client system.

E. Forwarding-Based Protocol—Client Mapping Approach

Figure 8A:
FIGS. 8a-8d illustrate a forwarding-based protocol employing a client mapping approach, which is implemented by the proxy manager of FIG. 6 for forwarding NFSv3 client requests from a clustered storage server system to a remote storage server.

In one embodiment, the N-module 414.1 can communicate with the remote storage server 409 over the network pathway 407 using the client mapping approach of the forwarding-based protocol as follows. It is noted that each of the N-modules 414.2-414.3 can communicate with the storage server 409 using the client mapping approach of the forwarding-based protocol in a similar fashion. First, the N-module 414.1 receives a request from a client system (i.e., the client system 404.1 or 404.2) for reading data from or writing data to a data file stored on a volume of the storage server 409, according to the NFSv3 protocol. FIG. 8a depicts an exemplary NFSv3 client request 802, which is a Remote Procedure Call (RPC) including a Client ID and an NFS Request, i.e., a command to read data from or write data to the remote volume. The Client ID can include the client IP address and the client port number, and the NFS Request can include a transaction identifier (XID). The Client ID and XID uniquely identify the NFSv3 request. It is understood that the NFSv3 request 802 can also include a file handle for the data file that is compliant with the clustered storage server system 402. The file handle can include the MSID and the inode information corresponding to the remote volume.

Next, the file handles included in the client request 802 are substituted with new file handles that are compliant with the remote storage server 409. To that end, the MSID and the inode information from the file handle supplied by the client system as well as the corresponding FSid from the VLDB are used to generate the new file handle compliant with the storage server 409. In addition, to avoid possible ambiguity among multiple NFSv3 client requests received by the N-module 414.1, the Client ID is mapped to a unique port number of the N-module 414.1, thereby allowing the replay cache on the storage server 409 to respond properly, as described above in section D. To that end, the Client ID, which includes the client IP address and the client port number, is mapped from, e.g., the VIF 604 (see FIG. 6) interfacing the N-module 414.1 to the network pathways 405.3-405.4 to a suitable backend VIF, e.g., the VIF 606 (see FIG. 6) interfacing the N-module 414.1 to the network pathway 407 via a unique N-module port. This mapping of the Client ID from the VIF 604 to the VIF 606 can be stored in a client map on a designated volume in persistent storage within the clustered storage server system 402. Unlike the above-described tunneling approach of the forwarding-based protocol, the client mapping approach of the forwarding-based protocol requires persistent state information (i.e., the client map, and optionally the table of shadow locks described below in section G) to be stored on an intermediate N-module or D-module.

Figure 8B:
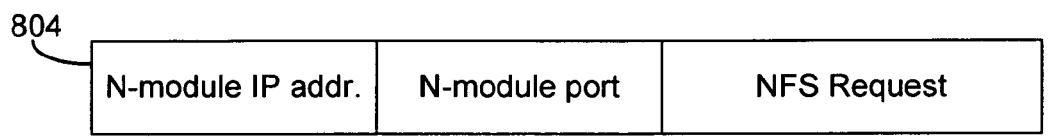

Next, a new NFSv3 client request is generated to the remote storage server 409, passing the new file handle compliant with the storage server 409 with the NFSv3 request. FIG. 8b depicts an exemplary NFS request 804, which includes the unique N-module port number from the client map, and a copy of the NFS Request. The NFS request 804 further includes the IP address and port number of the N-module as part of the communication protocol connection between the remote storage server 409 and the N-module 414.1. The N-module 414.1 transmits or forwards, over the network pathway 407, the NFS request 804 to the storage server 409, which picks off the N-module IP address, and extracts the NFS Request. Next, the storage server 409 passes the NFS Request to the NFSv3 layer of the storage server 409, and then to the WAFL layer of the storage server 409 to read data from or write data to the data file stored on the remote volume.

Figure 8C:
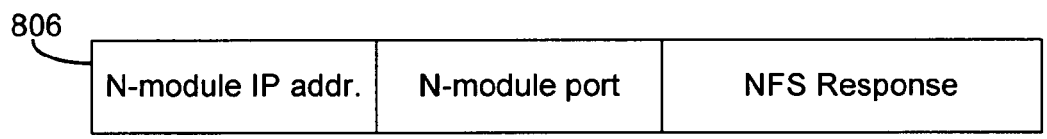
Figure 8D:

The remote storage server 409 then generates an NFSv3 response to the N-module 414.1. In the event the client request was a data read request, the NFSv3 response contains the requested data from the remote volume of the storage server 409. FIG. 8c depicts an exemplary NFSv3 response 806, which is an RPC including the NFS Response. As shown in FIG. 8c, the NFSv3 response 806 contains the unique N-module port number from the client map, and the NFS Response. The NFS response 806 further includes the IP address and port number of the N-module as part of the communication protocol connection between the remote storage server 409 and the N-module 414.1. It is understood that the NFSv3 response 806 can also include one or more File handles compliant with the storage server 409. The storage server 409 transmits, over the network pathway 407, the NFS response 806 to the N-module 414.1. Next, each file handle included in the NFS response 806 is substituted with a new file handle that is compliant with the clustered storage server system 402. To that end, the FSid information and the inode information from the file handle included in the NFS response 806 as well as the corresponding MSID from the VLDB are can be employed to generate the new file handle compliant with the clustered system 402. In addition, the client map is queried, using the IP address of the backend VIF (e.g., the VIF 606 on the N-module 414.1) and the unique N-module port number included in the NFS response 806, to find the corresponding Client ID information. Next, a client response is generated to the client system, passing the file handle of the clustered storage server system 402 with the response. FIG. 8d depicts an exemplary client response 808, which is an RPC including the Client ID and the NFS Response. Like the client request 802, the client response 808 is generated according to the NFSv3 protocol. The N-module 414.1 then transmits, over the appropriate network pathway 405.3-405.4, the NFSv3 response 808 to the client system.

F. Referral-Based Protocol

In the event the N-module 414.1 receives a client request for reading data from or writing data to a data file stored on a volume of the remote storage server 409 according to the Network File System version 4 Protocol (NFSv4) or CIFS protocol, the N-module 414.1 can use the referral feature of the NFSv4 or CIFS protocol to communicate with a client system, thereby re-directing the client request by issuing a re-direct directive to the client system. It is noted that in order to handle the re-direct directive issued by the N-module 414.1, the client system is configured to support NFSv4 or CIFS redirection.

Figure 9:
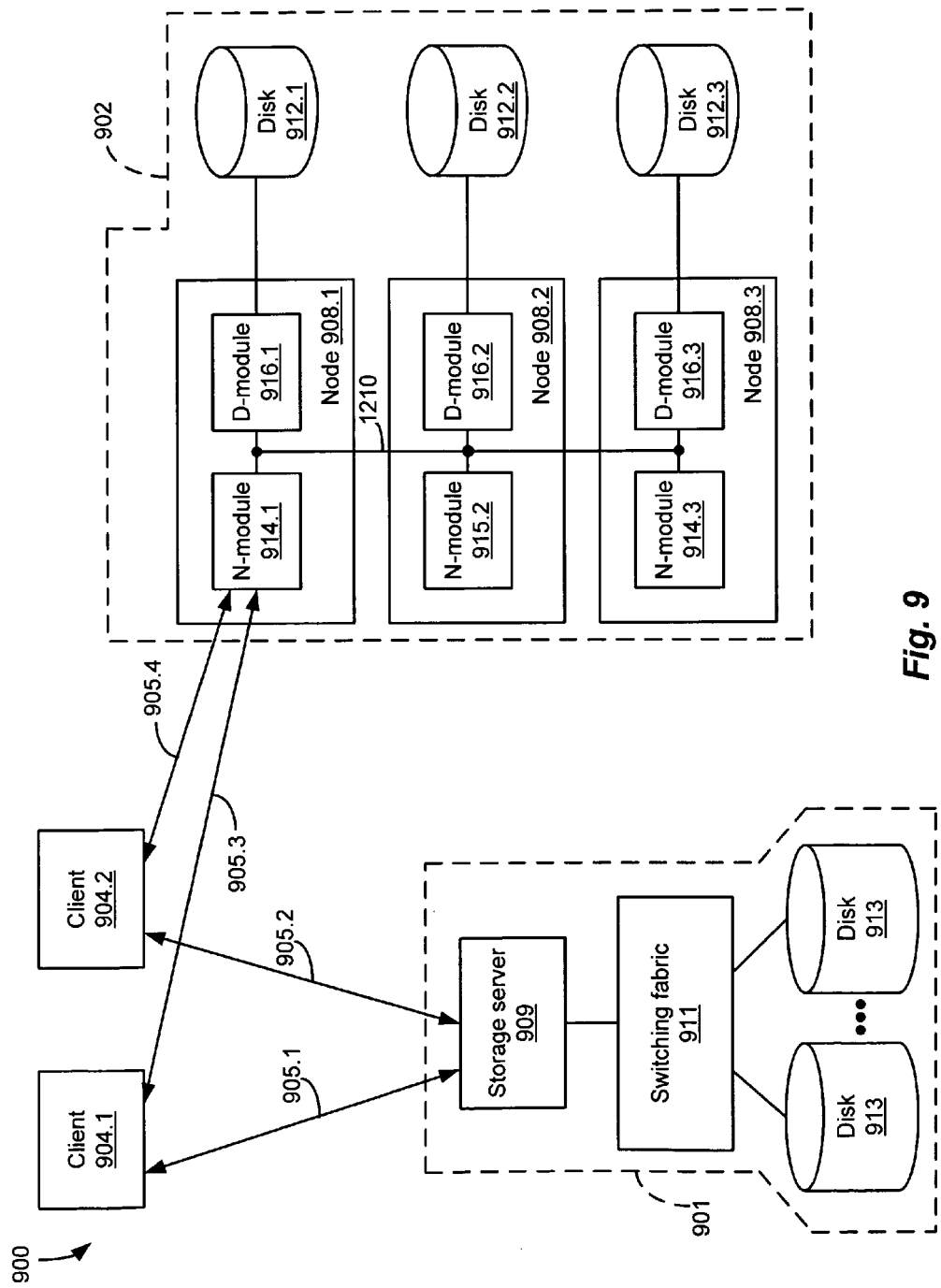
FIG. 9 is a block diagram of an alternative embodiment of a network data storage environment including a clustered storage server system and at least one remote storage server, according to the present invention.

FIG. 9 depicts an illustrative embodiment of a network data storage environment 900, including a storage server system 901 and a clustered storage server system 902, in accordance with the present invention. Like the network data storage environment 400 (see FIG. 4), the network data storage environment 900 provides users of the storage server system 901 with the ability to gain the advantages of the clustered storage server system 902, in which volumes from multiple server nodes are linked into a virtual global hierarchical namespace, without first having to migrate their data from the storage server system 901 to the clustered storage server system 902.

However, the network data storage environment 900 employs the referral-based protocol to perform redirection of NFSv4 or CIFS requests for manipulating (i.e., reading or writing) data on remote volumes stored on the storage server system 901.

As depicted in FIG. 9, the network data storage environment 900 includes a plurality of client systems 904.1-904.2, and a plurality of network pathways 905.1-905.4 disposed between the client systems 904.1-904.2, the storage server system 901, and the clustered storage server system 902. The storage server system 901 includes a storage server 909, at least one mass storage device such as a disk 913, and a switching fabric 911 interconnecting the storage server 909 and the disk 913. For example, the client systems 904.1-904.2 are communicably connectable to the storage server 909 over the network pathways 905.1-905.2, respectively. The clustered storage server system 902 includes a plurality of server nodes 908.1-908.3, a cluster switching fabric 910, and a plurality of mass storage devices such as disks 912.1-912.3. Each of the client systems 904.1-904.2 is communicably connectable to each one of the nodes 908.1-908.3 over a suitable network pathway. For example, the client systems 901.1-901.2 are connectable to the node 908.1 over the network pathways 905.3-905.4, respectively. Each of the plurality of nodes 908.1-908.3 is configured to include an N-module, a D-module, and an M-host, each of which can be implemented as a software module. It is noted that FIG. 9 depicts only the N-module and the D-module within each of the nodes 908.1-908.3 for clarity of illustration. It is further noted that a switched virtualization layer including a plurality of VIFs is provided below the interface between the respective N-modules 914.1-914.3 and the client systems 904.1-904.2, and that the clustered storage server system 902 can be organized into any suitable number of virtual servers (vservers).

Figure 10A:
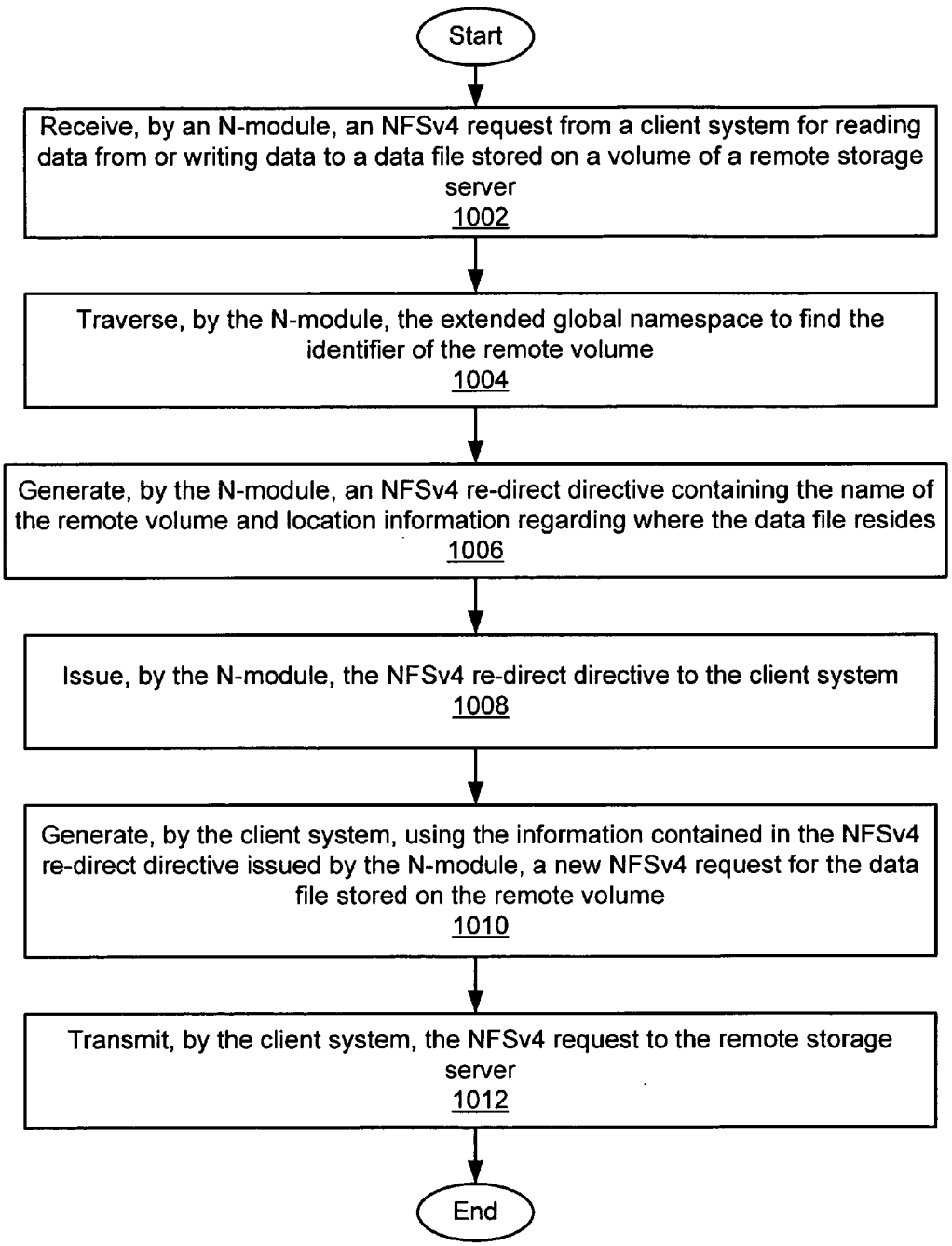
FIG. 10a is a flow diagram illustrating an exemplary method of performing redirection of an NFSv4 request, using a referral-based protocol.

In one embodiment, the network data storage environment 900 employs the referral-based protocol to perform redirection of an NFSv4 request for manipulating data stored on a volume of the remote storage server 909 as follows. In this exemplary embodiment, the names of a plurality of volumes RT, vol1, vol2, vol3, vol4, vol5 from the plurality of nodes 908.1-908.3, and the names of a plurality of volumes rvol6, rvol7 of the storage server 909, are linked into an extended virtual global hierarchical namespace such as the extended global namespace 512 (see FIG. 5b). As depicted in step 1002 (see FIG. 10a), the N-module 914.1 receives, over the network pathway 905.3, a client request from the client system 904.1 for reading data from or writing data to a data file stored on the volume rvol6 of the remote storage server 909, according to the NFSv4 protocol. Next, as depicted in step 1004, the N-module 914.1 traverses the extended global namespace 512 to find an identifier, specifically, the MSID/DSID, of the volume rvol6, consulting the junction and volume tables maintained by the VLDB, as appropriate. As depicted in step 1006, the N-module 914.1 then generates an NFSv4 re-direct directive containing the name of the volume rvol6 and location information regarding where the data file on the volume rvol6 resides, as derived from the MSID/DSID of the volume rvol6. Next, as depicted in step 1008, the N-module 914.1 issues the NFSv4 re-direct directive to the client system 904.1 over the network pathway 905.3. As depicted in step 1010, the client system 904.1 then generates, using the information contained in the NFSv4 re-direct directive, a new NFSv4 request for the data file on the volume rvol6, and, as depicted in step 1012, transmits the NFSv4 request to the storage server 909 over the network pathway 905.1.

Figure 10B:
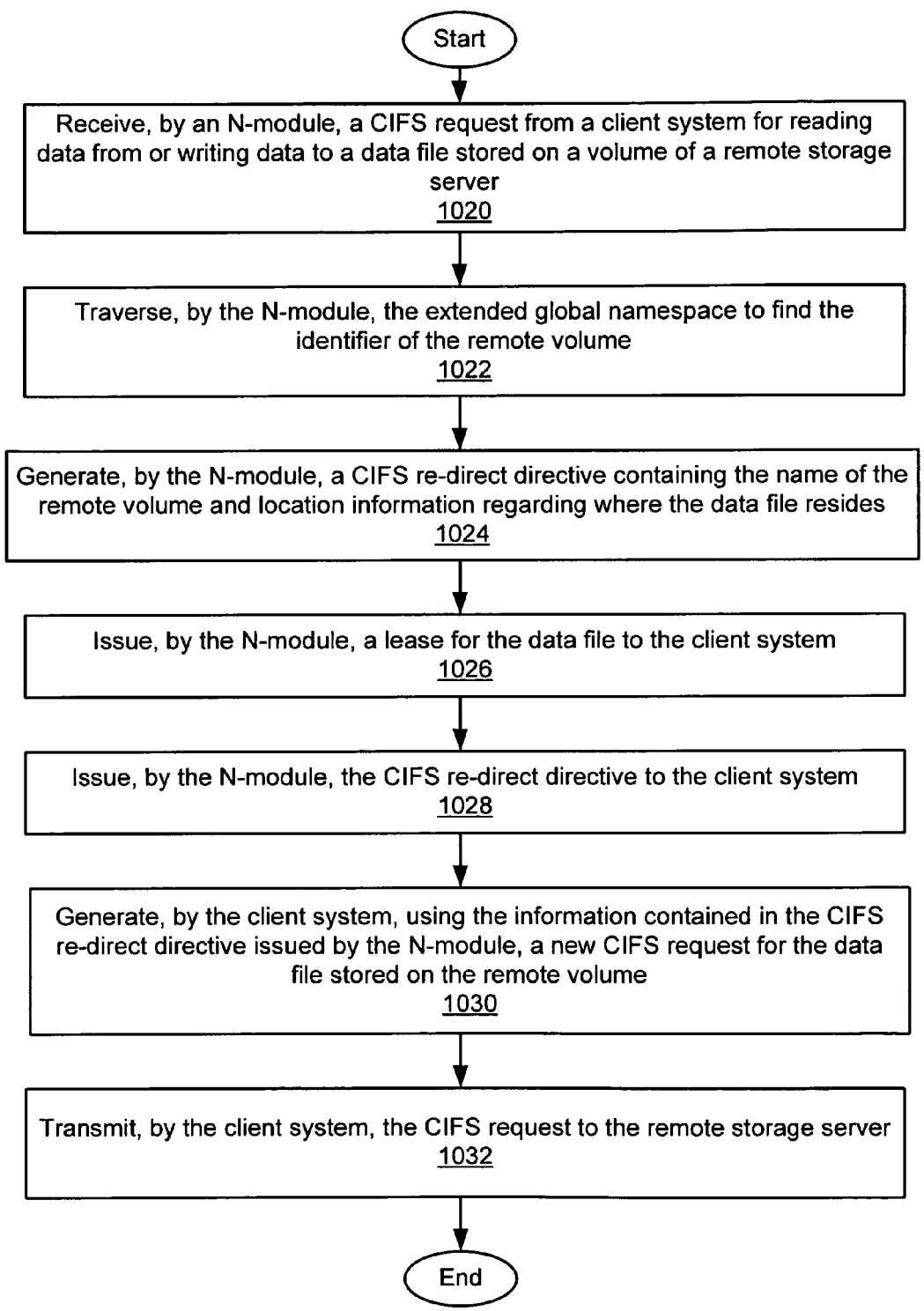
FIG. 10b is a flow diagram illustrating an exemplary method of performing redirection of a CIFS request, using the referral-based protocol.

In another embodiment, the network data storage environment 900 employs the referral-based protocol to perform redirection of a CIFS request for manipulating data stored on a volume of the remote storage server 909 as follows. In this exemplary embodiment, the names of the volumes RT, vol1, vol2, vol3, vol4, vol5 from the nodes 908.1-908.3, and the names of the volumes rvol6, rvol7 of the storage server 909, are linked into the extended global namespace 512 (see FIG. 5b). As depicted in step 1020 (see FIG. 10b), the N-module 914.1 receives, over the network pathway 905.3, a client request from the client system 904.1 for reading data from or writing data to a data file stored on the volume rvol6 of the storage server 909, according to the CIFS protocol. In this exemplary embodiment, it is understood that the client system 904.1 is a CIFS client having Distributed File System (DFS) capability. Next, as depicted in step 1022, the N-module 914.1 traverses the extended global namespace 512 to find an identifier, specifically, the MSID/DSID, of the volume rvol6, consulting the junction and volume tables maintained by the VLDB, as appropriate. As depicted in step 1024, the N-module 914.1 then generates a CIFS re-direct directive containing the name of the volume rvol6 and location information regarding where the data file on the volume rvol6 resides, as derived from the MSID/DSID of the volume rvol6. Next, as depicted in step 1026, the N-module 914.1 issues the client system 904.1 a lease for the data file, and, as depicted in step 1028, issues the CIFS re-direct directive to the client system 904.1 over the network pathway 905.3. As depicted in step 1030, the client system 904.1 then generates, using the information contained in the CIFS re-direct directive, a new CIFS request for the data file on the remote volume rvol6, and, as depicted in step 1032, transmits the CIFS request to the storage server 909 over the network pathway 905.1. For the duration of the lease, the client system 904.1 directly manipulates the data stored on the volume of the storage server 909 over the network pathway 905.1. It is noted that, in the event the lease expires, the client system 904.1 can communicate with the N-module 914.1 over the network pathway 905.3 to renew the lease for the data file.

G. Load Sharing Mirrors

As discussed above with reference to the network data storage environment 200 including the clustered storage server system 202 (see FIG. 2), each MSID can specify a volume or a set of mirrors of the same volume. A number of advantages can be achieved by providing a set of mirrored volumes, such as high availability (e.g., if one volume of the set of mirrored volumes becomes unavailable, then data can still be accessed via the other volumes within the set of mirrored volumes) and improved performance (e.g., data traffic can be shared between volumes of the set of mirrored volumes, thereby reducing the load on each individual volume). Load sharing mirrors can be employed within the network data storage environment 400 including the storage server system 401 and the clustered storage server system 402 to allow loads to the disks 412.1-412.3, 413 within the storage server systems 401, 402 to be balanced or shared. Similarly, load sharing mirrors can be employed within the network data storage environment 900 including the storage server system 901 and the clustered storage server system 902, thereby allowing loads to the disks 912.1-912.3, 913 within the storage server systems 901, 902 to be balanced or shared.

Figure 11:
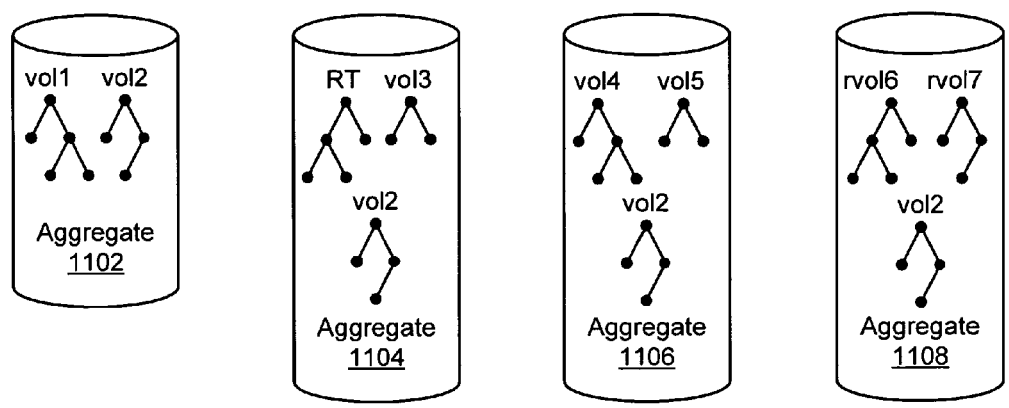
FIG. 11 is a diagram illustrating four exemplary aggregates included in the clustered storage server system and the remote storage server of FIG. 4, in which the four aggregates contain a set of mirrored volumes.

For purposes of illustration, the use of load sharing mirrors within the network data storage environment 400 including the storage server system 401 and the clustered storage server system 402 is described below with reference to FIG. 11, which depicts three exemplary aggregates 1102, 1104, 1106 controlled by the D-modules 416.1-416.3 of the clustered system 402. For example, the D-module 416.1 may control the aggregate 1102, the D-module 416.2 may control the aggregate 1104, and the D-module 416.3 may control the aggregate 1106. It is noted that each of the D-modules 416.1-416.3 can control one or more aggregates at any time. FIG. 11 also depicts one exemplary aggregate 1108 within the storage server system 401, which is separate and remote from the clustered system 402. The aggregates 1102, 1104, 1106, 1108 contain the volumes RT, vol1, vol2, vol3, vol4, vol5, rvol6, rvol7 whose names are linked into the extended global namespace 512 (see FIG. 5b). Specifically, the aggregate 1102 contains the two volumes vol1, vol2, the aggregate 1104 contains the two volumes RT, vol3, the aggregate 1106 contains the two volumes vol4, vol5, and the aggregate 1108 contains the two volumes rvol6, rvol7. As shown in FIG. 11, each of the aggregates 1104, 1106, 1108 also contains a copy of the volume vol2 contained in the aggregate 1102. The copies of the volume vol2 contained in the aggregates 1102, 1104, 1106, 1108 are referred to herein as "read-only load sharing mirrors for the volume vol2", and are referred to herein collectively as "a set of mirrored volumes vol2". It is noted that each volume within the set of mirrored volumes vol2 has the same MSID, but a different DSID.

The ability to copy data from a source volume to a destination volume allows the implementation of load sharing mirrors, such as the set of mirrored volumes vol2 described above with reference to FIG. 11. Such copying of data from a source volume to a destination volume can be performed using the SnapMirror facility of the NETAPP® DATA ONTAP® storage operating system, or any other suitable asynchronous mirroring technique capable of preserving file handle information, thereby assuring that a file handle of the source volume will be identical to that of the destination volume. It is noted that the SnapMirror facility can preserve such file handle information, including file server identifications (FSids), inode numbers, snapshots and snapshot IDs, and qtrees and qtree IDs.

In the context of the present invention, a snapshot is a persistent point in time image of an active storage system that enables quick recovery of data after data has been corrupted, lost, or altered. Snapshots can be created by copying the data at a plurality of specified points in time to form a consistent image. Snapshots can also be created virtually by using a pointer to form the image of the data. A snapshot can be used as a storage space-conservative mechanism, generally composed of read-only data structures that enable a client or system administrator to obtain a copy of all or a portion of the storage system, as of a specified time in the past, i.e., when the snapshot was taken. In a WAFL-based system, a qtree is a predefined unit that is both administratively visible and externally addressable. Such a qtree corresponds to a subtree in a volume's storage system. Further, a volume can contain multiple qtrees. A qtree acts similarly to limits enforced on collections of data by the size of a partition in a traditional UNIX or Windows file system, but provides the ability to subsequently change the limits, as qtrees have no connection to a specific range of blocks on a physical disk. Unlike volumes, which are mapped to a particular collection of disks (e.g., a RAID group of disks) and act more like traditional partitions, qtrees are implemented at a higher level than volumes, and therefore provide increased flexibility.

By way of background, the SnapMirror facility of the DATA ONTAP® storage operating system is an automated storage system replication (duplication) facility. SnapMirror technology provides asynchronous mirroring of a data set between the storage server 409 (or 909) and the clustered system 402 (or 902), thereby enabling remote maintenance of consistent copies of a storage server's volume data. As used herein, a data set is defined as one or more storage units, such as volumes or qtrees. The SnapMirror facility can periodically replicate a data set stored on a storage server at a user-definable time interval. At the end of each replication event, the backup data set becomes an exact block-for-block mirror copy of the original data set. At that point, the two data sets share identical data content and characteristics. The mirror copy is initialized by effectively copying the entire data set stored on a storage server to the backup data set. Once this initial copy is complete, replication events thereafter copy only changed blocks from the original data set to the backup data set, thereby providing an efficient data replication mechanism. Such an implementation of load sharing mirrors can help avoid excessive loads being applied to the disks 412.1-412.3, 413 within the network data storage environment 400. Because a set of mirrored volumes can be provided on the disks 412.1-412.3 of the clustered system 402 and on the disk(s) 413 of the storage server 409, load sharing mirrors can be implemented within the network data storage environment 400 with increased flexibility. It is understood that load sharing mirrors can be similarly implemented within the network data storage environment 900 (see FIG. 9).

Figure 12A:
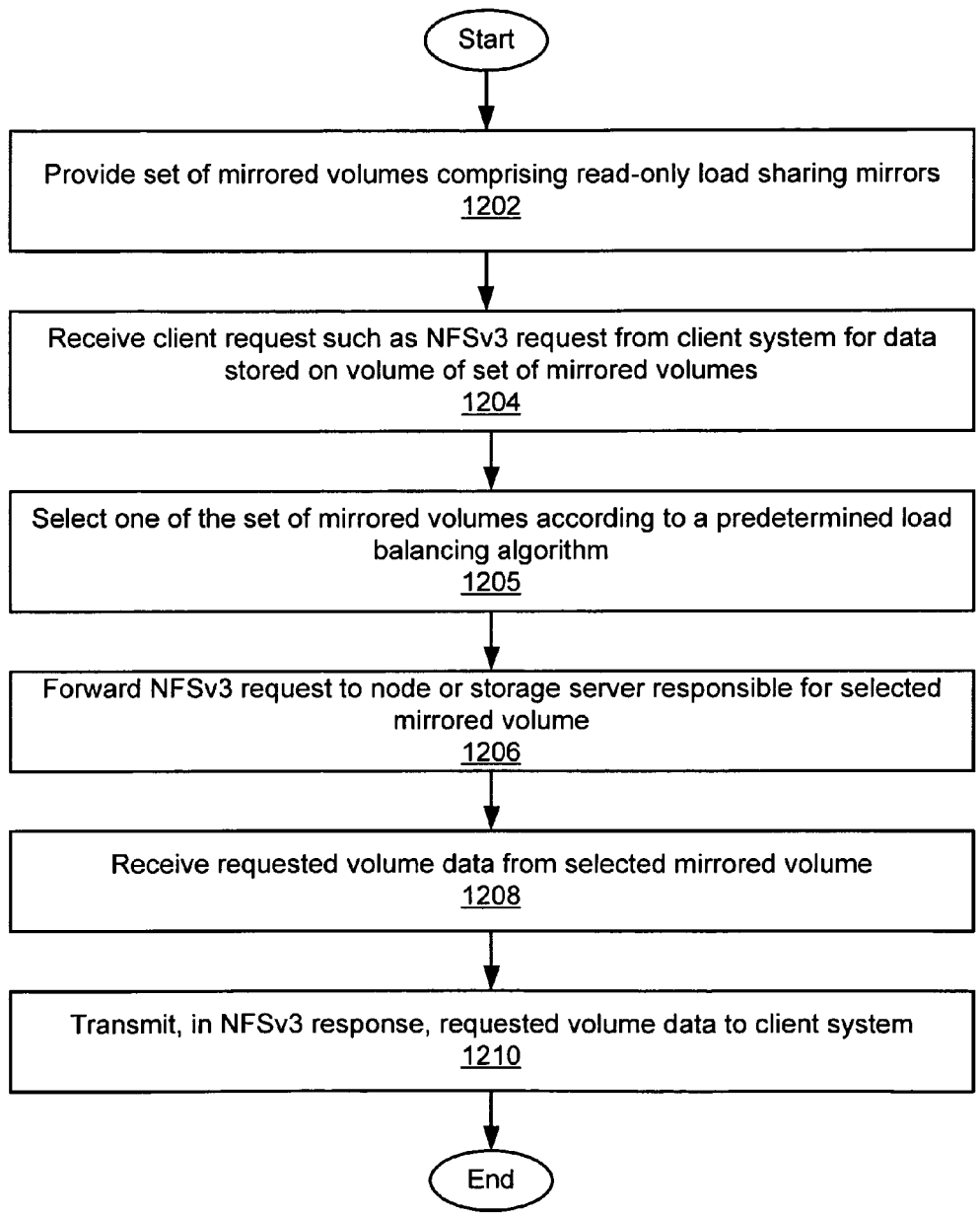
FIG. 12a is a flow diagram illustrating a method of load sharing mirroring within the network data storage environment of FIG. 4.

A first illustrative method of load sharing mirroring, for use in balancing or sharing loads to the disks 413 of the storage server system 401 and to the disks 412.1-412.3 of the clustered storage server system 402 within the network data storage environment 400, is described below with reference to FIGS. 4 and 12a. In this first illustrative method, the balancing or sharing of loads is achieved using the above-described forwarding-based protocol (tunneling approach or client mapping approach). As depicted in step 1202, a set of mirrored volumes is provided on the disks 412.1-412.3, 413. It is noted that the read-only load sharing mirrors may be created using the SnapMirror facility of the DATA ONTAP® storage operating system. Next, one of the N-modules 414.1-414.3 within the clustered storage server system 402 receives a client request, such as an NFSv3 request, from one of the client systems 404.1-404.2 for data stored on a volume of the set of mirrored volumes, as depicted in step 1204. The N-module receiving the NFSv3 request then selects one volume from the set of mirrored volumes, in accordance with any suitable load balancing algorithm, as depicted in step 1205. For example, the selection of volumes from the set of mirrored volumes in step 1205 may be performed using a round robin approach to evenly distribute the NFSv3 requests among the copies of the volumes, taking into account the load on each volume copy before assigning a request to that copy. Next, the N-module forwards the request to the storage server 409 or the D-module responsible for the selected mirrored volume, as depicted in step 1206. For example, in the event the selected mirrored volume is a remote volume of the storage server 409, the N-module can communicate with the storage server 409 using the above-described forwarding-based protocol (tunneling approach or client mapping approach). Next, the requested volume data is received from the selected mirrored volume by the N-module, as depicted in step 1208. The N-module then transmits, in an NFSv3 response, the requested volume data to the client system, as depicted in step 1210. It is noted that the illustrative method of load sharing mirroring depicted in FIG. 12a is performed on a per-request basis.

Figure 12B:
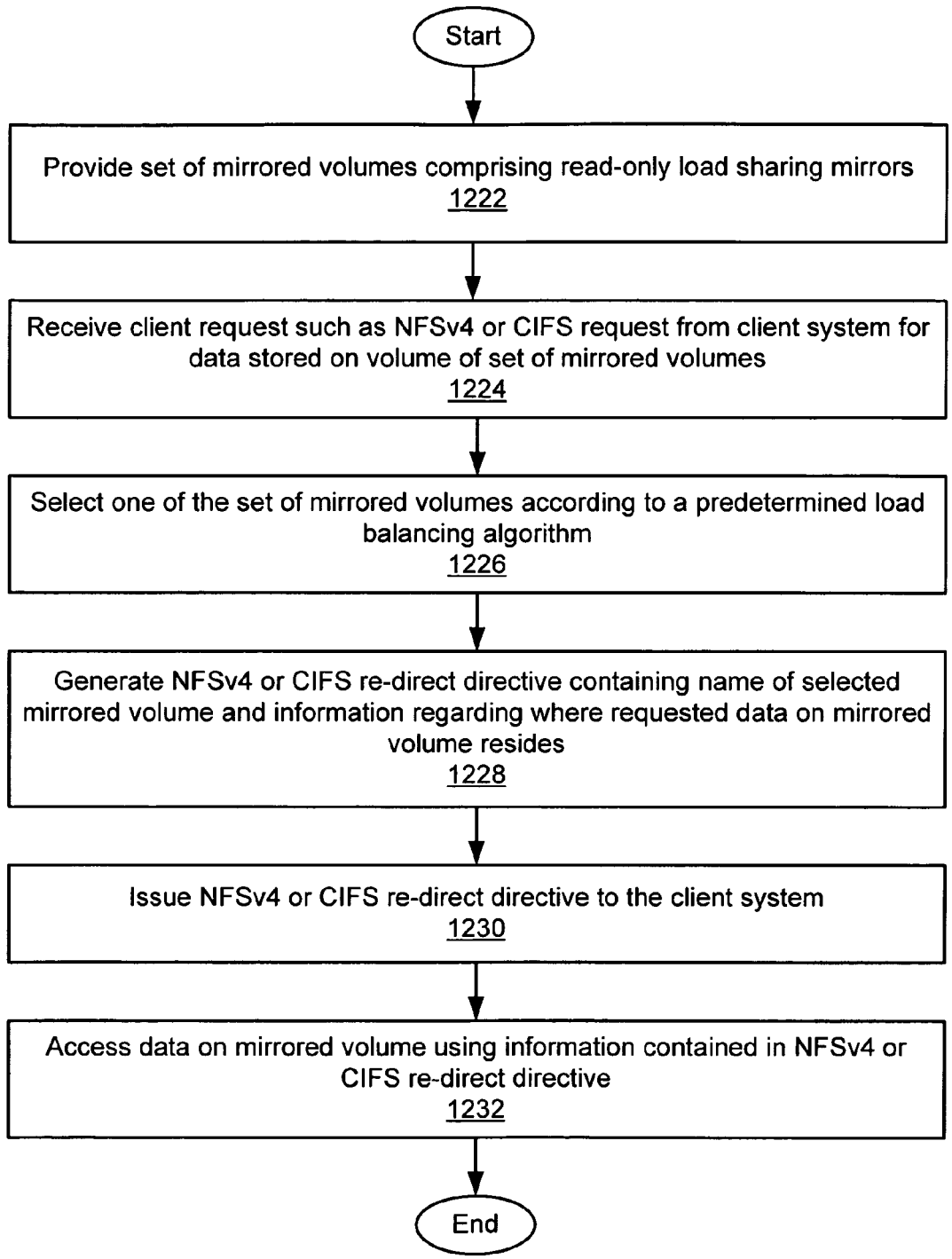
FIG. 12b is a flow diagram illustrating a method of load sharing mirroring within the network data storage environment of FIG. 9.

A second illustrative method of load sharing mirroring, for use in balancing or sharing loads to the disks 913 of the storage server system 901 and to the disks 912.1-912.3 of the clustered storage server system 902 within the network data storage environment 900 is described below with reference to FIGS. 9 and 12b. In this second illustrative method, the balancing or sharing of loads is achieved using the above-described referral-based protocol. As depicted in step 1222, a set of mirrored volumes is provided on the disks 912.1-912.3, 913. As in the first illustrative method described above, the read-only load sharing mirrors may be created using the SnapMirror facility. Next, one of the N-modules 914.1-914.3 within the clustered storage server system 902 receives a client request, such as an NFSv4 or CIFS request, from one of the client systems 904.1-904.2 for data stored on a remote volume of the set of mirrored volumes, as depicted in step 1224. The N-module receiving the NFSv4 or CIFS request then selects one volume from the set of mirrored volumes, in accordance with any suitable load balancing algorithm, as depicted in step 1226. Next, the N-module generates an NFSv4 or CIFS re-direct directive containing the name of the selected volume and location information regarding where the requested data on the selected volume resides, as depicted in step 1228. The N-module then issues the NFSv4 or CIFS re-direct directive to the client system, as depicted in step 1230, and the client system accesses the volume data using the information contained in the re-direct directive, as depicted in step 1232. It is noted that the illustrative method of load sharing mirroring depicted in FIG. 12*b* is performed on a per-client basis.

It should be understood that the operations performed by the above-described illustrative embodiments are purely exemplary and imply no particular order. Further, the operations can be used in any sequence when appropriate and can be partially used. With the above embodiments in mind, it should be understood that the present invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present invention are useful machine operations. The present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The present invention can also be embodied as computer readable code on a computer readable medium. The computer readable medium is any data storage device that can store data, which can be thereafter be read by a computer system. Examples of the computer readable medium include hard drives accessible via Network Attached Storage (NAS), Storage Area Networks (SAN), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. The computer readable medium can also be distributed using a switching fabric, such as used in computer farms.

It will be appreciated by those of ordinary skill in the art that modifications to and variations of the above-described system and method of read-only mirroring for load sharing may be made without departing from the inventive concepts disclosed herein. Accordingly, the invention should not be viewed as limited except as by the scope and spirit of the appended claims.

What is claimed is:

1. A method of load sharing within a network data storage system, said method comprising:
    storing at least one first volume of a set of mirrored volumes on one or more of at least one storage server of a cluster of storage servers and at least one remote storage server, wherein each storage device in said cluster of storage servers is interconnected with a cluster switching fabric, wherein each storage device in said remote storage server is interconnected with a storage server switching fabric, and wherein said cluster switching fabric and said storage server switching fabric are two different switching fabrics; and
    storing at least one second volume of said set of mirrored volumes on said at least one remote storage server, wherein each of said at least one first volume and said at least one second volume of said set of mirrored volumes is linked into a global namespace of volumes of said cluster of storage servers, said global namespace being extended to include each volume of said set of mirrored volumes stored on the remote storage server.

2. The method of claim 1 wherein each of said at least one first volume and each of said at least one second volume of said set of mirrored volumes is linked into said global namespace via a junction corresponding to an internal mount point in said global namespace for the respective volume.

3. The method of claim 1 further including:
    receiving, at one of said storage servers of said cluster of storage servers, a request from a client for data on a volume of said set of mirrored volumes;
    in response to the client request, selecting, at said one of said storage servers of said cluster of storage servers, a volume of said set of mirrored volumes;
    responsive to the selected volume being stored on the remote storage server, obtaining, using the extended global namespace, location information for the selected remote volume of said set of mirrored volumes;
    locating the selected remote volume of said set of mirrored volumes using said location information;
    accessing the requested data on the located remote volume of said set of mirrored volumes;
    receiving, at said remote storage server, a direct request from a client for data on said remote storage server; and
    accessing the requested data on said remote storage server.

4. The method of claim 3:
    wherein each of said at least one second volume of said set of mirrored volumes stored on the remote storage server is linked into the extended global namespace via a junction corresponding to an internal mount point in the extended global namespace for the respective second volume;
    wherein the client request includes a volume identifier for said volume of said set of mirrored volumes; and
    wherein said obtaining of said location information includes querying, by said one of said storage servers of said cluster of storage servers using said volume identifier for said volume of said set of mirrored volumes, at least one database to obtain said location information for the selected remote volume of said set of mirrored volumes, said location information being associated with said internal mount point in the extended global namespace for the respective one of said mirrored volumes of said remote storage server.

5. The method of claim 3 wherein said receiving of said request from said client includes receiving a client identifier in association with the request.

6. The method of claim 5 wherein said client identifier includes one or more of an IP address and a port number associated with said client.

7. The method of claim 5 wherein said receiving of said request from said client includes receiving a request from said client for reading data from a data file stored on said volume of said set of mirrored volumes.

8. The method of claim 7 wherein said request received from said client includes a file handle for said data file, wherein said file handle is compliant with said cluster of storage servers.

9. The method of claim 8 further including replacing said file handle included in said request with a file handle that is compliant with said remote storage server.

10. The method of claim 5 wherein said request received from said client for data on said volume of said set of mirrored volumes includes a transaction identifier.

11. The method of claim 5:
wherein said accessing of the requested data on the selected remote volume of said set of mirrored volumes includes generating a tunneled request for data on said volume of said set of mirrored volumes;
wherein said tunneled request includes an encapsulated tunneling header and an encapsulated copy of said request from said client for data on said volume of said set of mirrored volumes; and
wherein said encapsulated tunneling header includes the client identifier.

12. The method of claim 11 wherein said accessing of the requested data on the selected remote volume of said set of mirrored volumes further includes forwarding, by said one of said storage servers of said cluster of storage servers, said tunneled request to the remote storage server.

13. The method of claim 12:
wherein said accessing of the requested data on the selected remote volume of said set of mirrored volumes includes receiving, at said one of said storage servers of said cluster of storage servers, a tunneled response from the remote storage server; and
wherein said tunneled response includes an encapsulated copy of a response to said request from said client for data on said volume of said set of mirrored volumes.

14. The method of claim 13 wherein said accessing of the requested data on the selected remote volume of said set of mirrored volumes further includes extracting, at said one of said storage servers of said cluster of storage servers, the response to said request from said client from said encapsulated copy of the response.

15. The method of claim 14:
further including generating, at said one of said storage servers of said cluster of storage servers, a response for subsequent transmission to the client; and
wherein said response for subsequent transmission to the client comprises the response extracted from said encapsulated copy of said response.

16. The method of claim 15 further including transmitting, by said one of said storage servers of said cluster of storage servers to said client, said response including the extracted response, and said client identifier in association with said response.

17. The method of claim 13 wherein said receiving of said request from said client for data on said volume of said set of mirrored volumes includes receiving a request from said client for reading data from a data file stored on said volume of said set of mirrored volumes.

18. The method of claim 17 wherein said response to said request from said client for reading data from said volume of said set of mirrored volumes includes a file handle for said data file, and wherein said file handle is compliant with said remote storage server.

19. The method of claim 18 further including replacing said file handle included in said response with a file handle that is compliant with said cluster of storage servers.

20. The method of claim 5:
wherein said accessing of the requested data on the selected remote volume of said set of mirrored volumes includes generating a tunneled request for data on said volume of said set of mirrored volumes;
wherein said tunneled request includes an encapsulated tunneling header and an encapsulated copy of said request from said client for data on said volume of said set of mirrored volumes; and
wherein said encapsulated tunneling header includes the client identifier and an identifier of a virtual interface through which said request from said client was received at said one of said storage servers of said cluster of storage servers.

21. The method of claim 5:
wherein said accessing of the requested data on the selected remote volume of said set of mirrored volumes includes generating a tunneled request for data on said volume of said set of mirrored volumes;
wherein said tunneled request includes an encapsulated tunneling header and an encapsulated copy of said request from said client for data on said volume of said set of mirrored volumes; and
wherein said encapsulated tunneling header includes the client identifier and authentication information for use in authenticating the client.

22. The method of claim 5 further including mapping said client identifier to a unique port number of said one of said storage servers of said cluster of storage servers.

23. The method of claim 22 wherein said mapping of said client identifier to said unique port number includes mapping said client identifier from an identifier of a virtual interface, referred to as a client-facing virtual interface, through which the client request was received by said one of said storage servers of said cluster of storage servers, to an identifier of a virtual interface, referred to as a remote storage server-facing virtual interface, interfacing, via said unique port number, said one of said storage servers of said cluster of storage servers to the remote storage server storing the selected remote volume of said set of mirrored volumes.

24. The method of claim 23 further including storing, in a client map, said mapping of said client identifier to said unique port number of said one of said storage servers of said cluster of storage servers, said client map being stored in a persistent storage within said cluster of storage servers.

25. The method of claim 24 wherein said accessing of the requested data on the selected remote volume of said set of mirrored volumes includes generating a client request including said unique port number and a copy of said request from said client for data on said volume of said set of mirrored volumes.

26. The method of claim 25 wherein said accessing of the requested data on the selected remote volume of said set of mirrored volumes further includes forwarding, by said one of said storage servers of said cluster of storage servers, said client request including said unique port number and said copy of said request from said client to the remote storage server.

27. The method of claim 26:
   wherein said accessing of the requested data on the selected remote volume of said set of mirrored volumes further includes receiving, at said one of said storage servers of said cluster of storage servers, a response to the forwarded client request from the remote storage server; and
   wherein said response to the forwarded client request includes said unique port number of said one of said storage servers of said cluster of storage servers.

28. The method of claim 27 further including querying, using the identifier of said remote storage server-facing virtual interface and said unique port number of said one of said storage servers of said cluster of storage servers, said client map to obtain said client identifier.

29. The method of claim 3 wherein said accessing of the requested data on the selected remote volume of said set of mirrored volumes includes generating a re-direct directive containing said location information for the selected remote volume of said set of mirrored volumes.

30. The method of claim 29 further including transmitting, by said one of said storage servers of said cluster of storage servers, said re-direct directive to said client.

31. The method of claim 29 wherein said receiving of said request from said client for data on said volume of said set of mirrored volumes includes receiving a request from said client for reading data from a data file stored on said volume of said set of mirrored volumes.

32. A system for accessing data on a volume of a storage server, for use in load sharing within a network data storage system, comprising:
   a cluster of storage servers; and
   at least one remote storage server separate from said cluster of storage servers, wherein one or more of at least one storage server of said cluster of storage servers and said at least one remote storage server is operative to store at least one first volume of a set of mirrored volumes, wherein each storage device in said cluster of storage servers is interconnected with a cluster switching fabric and each storage device in said remote storage server is interconnected with a storage server switching fabric, and wherein said cluster switching fabric and said storage server switching fabric are two different switching fabrics, wherein said at least one remote storage server is operative to store at least one second volume of said set of mirrored volumes, and wherein each of said at least one first volume and said at least one second volume of said set of mirrored volumes is linked into a global namespace of volumes of said cluster of storage servers, said global namespace being extended to include each volume of said set of mirrored volumes stored on the remote storage server.

33. The system of claim 32 wherein one of said storage servers of said cluster of storage servers is operative:
   to receive a request from a client for data on a volume of said set of mirrored volumes;
   in response to the client request, to select a volume of said set of mirrored volumes;
   in the event the selected volume is stored on the remote storage server, to obtain, using the extended global namespace, location information for the selected remote volume of said set of mirrored volumes;
   to locate the selected remote volume of said set of mirrored volumes using said location information;
   to access the requested data on the located remote volume of said set of mirrored volumes;
   to receive, at said remote storage server, a direct request from a client for data on said remote storage server; and
   to access the requested data on said remote storage server.

34. The system of claim 33 wherein said one of said storage servers of said cluster of storage servers is further operative to receive a client identifier in association with the request.

35. The system of claim 34:
   wherein said one of said storage servers of said cluster of storage servers is further operative to generate a tunneled request for data on said volume of said set of mirrored volumes;
   wherein said tunneled request includes an encapsulated tunneling header and an encapsulated copy of said request from said client for data on said volume of said set of mirrored volumes; and
   wherein said encapsulated tunneling header includes the client identifier.

36. The system of claim 35 wherein said one of said storage servers of said cluster of storage servers is further operative to forward said tunneled request to the remote storage server.

37. The system of claim 36:
   wherein said one of said storage servers of said cluster of storage servers is further operative to receive a tunneled response from the remote storage server; and
   wherein said tunneled response includes an encapsulated copy of a response to said request from said client for data on said volume of said set of mirrored volumes.

38. The system of claim 37 wherein said one of said storage servers of said cluster of storage servers is further operative to extract the response to said request from said client from said encapsulated copy of the response.

39. The system of claim 38:
   wherein said one of said storage servers of said cluster of storage servers is further operative to generate a response for subsequent transmission to the client; and
   wherein said response for subsequent transmission to the client comprises the response extracted from said encapsulated copy of said response.

40. The system of claim 39 wherein said one of said storage servers of said cluster of storage servers is further operative to transmit, to said client, said response including the extracted response and said client identifier in association with said response.

41. The system of claim 34 wherein said one of said storage servers of said cluster of storage servers is further operative to map said client identifier to a unique port number of the respective storage server.

42. The system of claim 41 wherein said one of said storage servers of said cluster of storage servers is further operative to map said client identifier from an identifier of a virtual interface, referred to as a client-facing virtual interface, through which the client request was received by said one of said storage servers of said cluster of storage servers, to an identifier of a virtual interface, referred to as a remote storage server-facing virtual interface, interfacing, via said unique port number, the storage server of said cluster of storage servers to the remote storage server storing the selected remote volume of said set of mirrored volumes.

43. The system of claim 42 wherein said one of said storage servers of said cluster of storage servers is further operative to store, in a client map in a persistent storage, said mapping of said client identifier to said unique port number of the respective storage server.

44. The system of claim 43 wherein said one of said storage servers of said cluster of storage servers is further operative to generate a second request including said unique port number and a copy of said request from said client for data on said volume of said set of mirrored volumes.

45. The system of claim 44 wherein said one of said storage servers of said cluster of storage servers is further operative to forward said second request including said unique port number and said copy of said request from said client to the remote storage server.

46. The system of claim 45:
wherein said one of said storage servers of said cluster of storage servers is further operative to receive a response to the forwarded second request from the remote storage server; and
wherein said response to the forwarded second request includes said unique port number of the respective storage server.

47. The system of claim 46 wherein said one of said storage servers of said cluster of storage servers is further operative to query, using the identifier of said remote storage server-facing virtual interface and said unique port number of the respective storage server, said client map to obtain said client identifier.

48. The system of claim 33 wherein said one of said storage servers of said cluster of storage servers is further operative to generate a re-direct directive containing said location information for the selected remote volume of said set of mirrored volumes.

49. The system of claim 48 wherein said one of said storage servers of said cluster of storage servers is further operative to transmit said re-direct directive to said client.

50. The system of claim 48 wherein said request from said client corresponds to a request for reading data from a data file stored on said volume of said set of mirrored volumes.

* * * * *